March 17, 1953   L. U. LARKIN   2,631,557
MACHINE FOR MAKING REFRIGERATOR LINERS
Filed Nov. 29, 1949   22 Sheets-Sheet 3
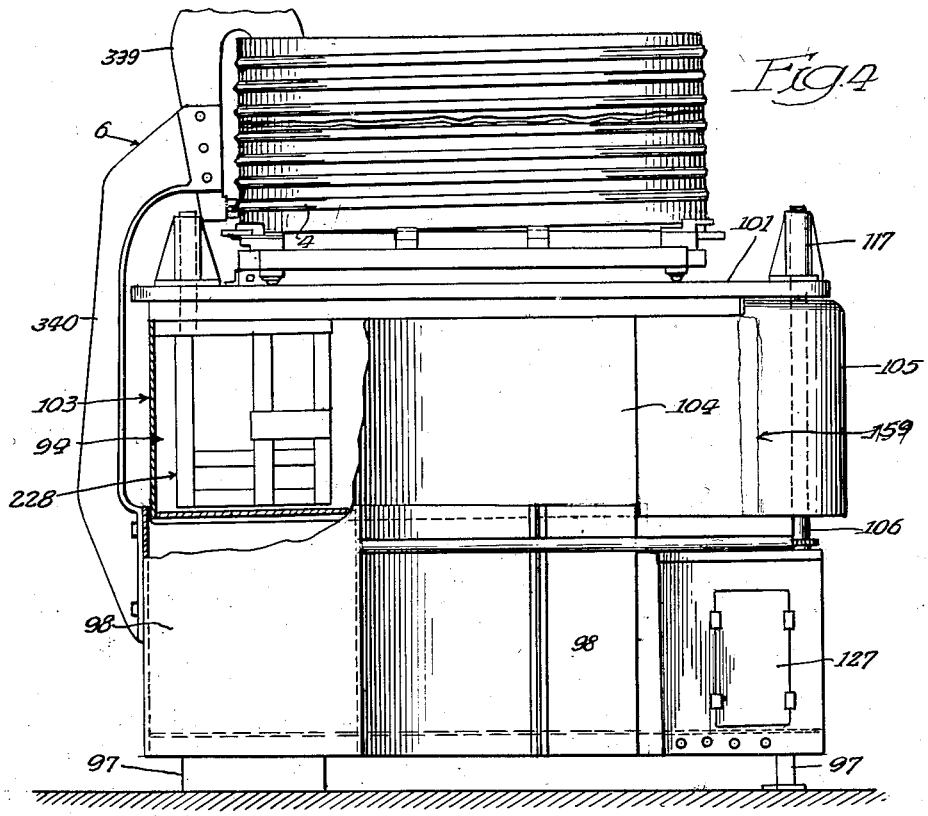
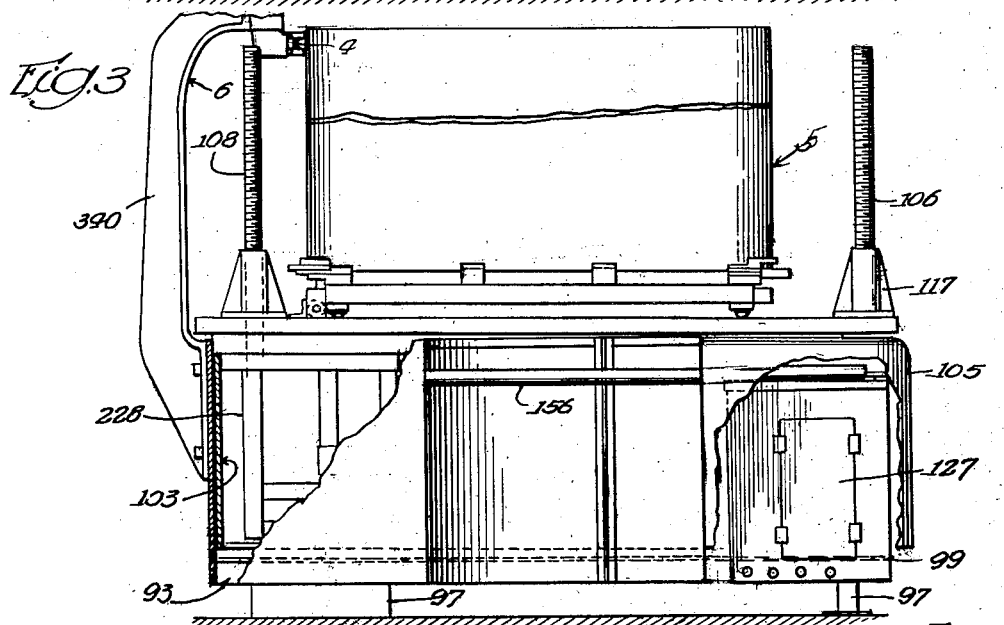
Inventor
LESTER U. LARKIN, DECEASED
BY: DOROTHY W. LARKIN, Administratrix
By: Spencer, Marzall, Johnston & Cook Attys

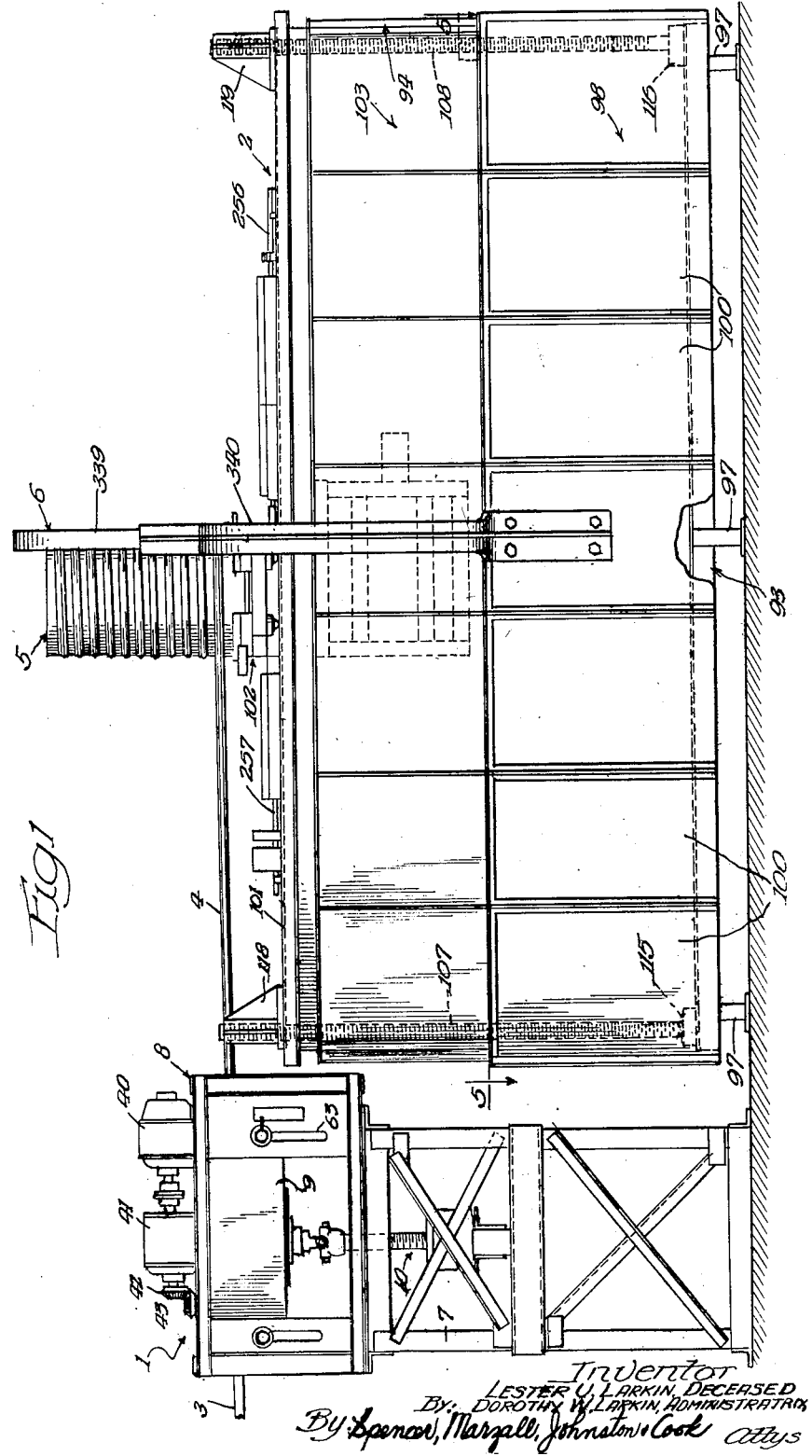

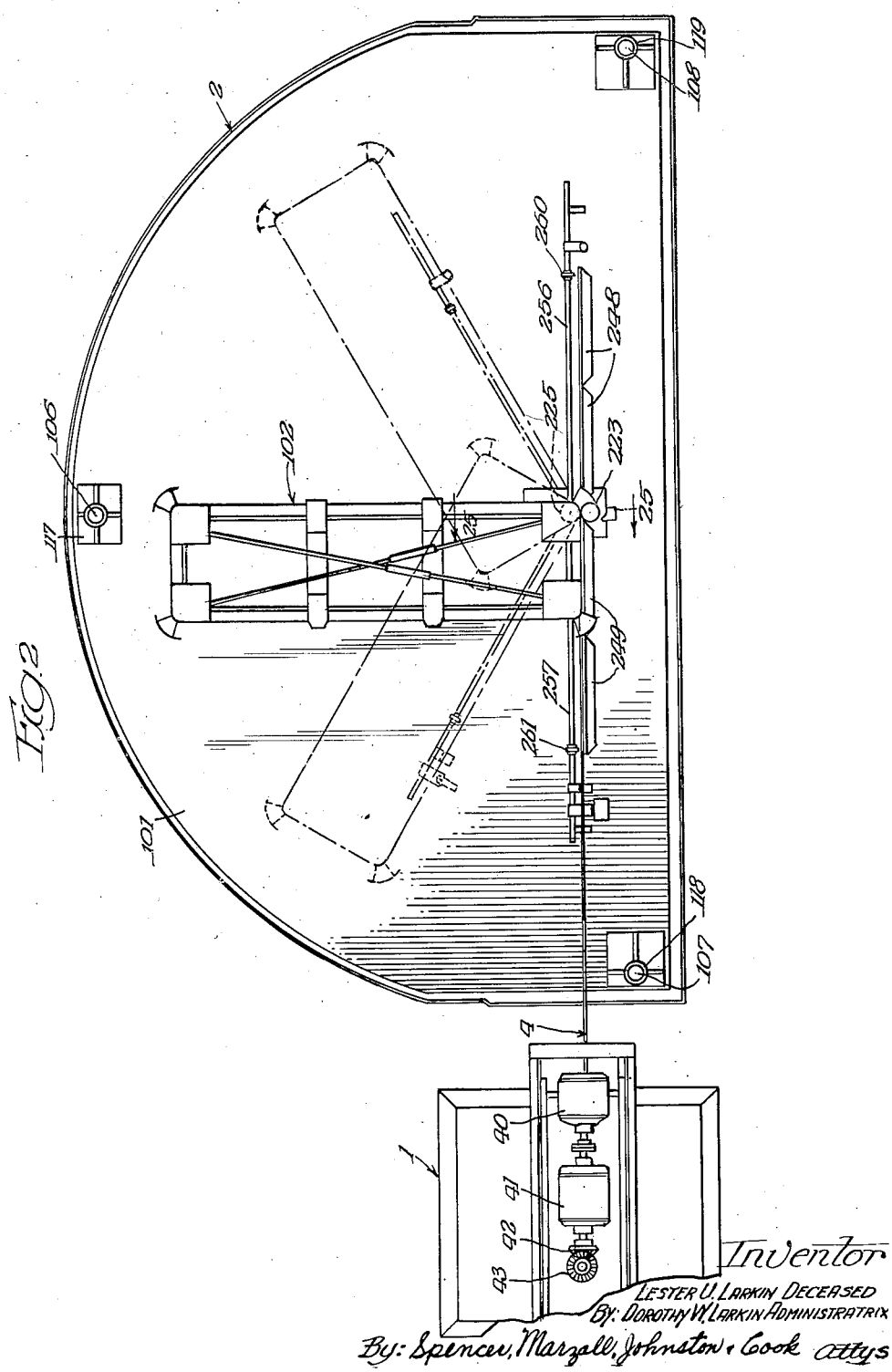

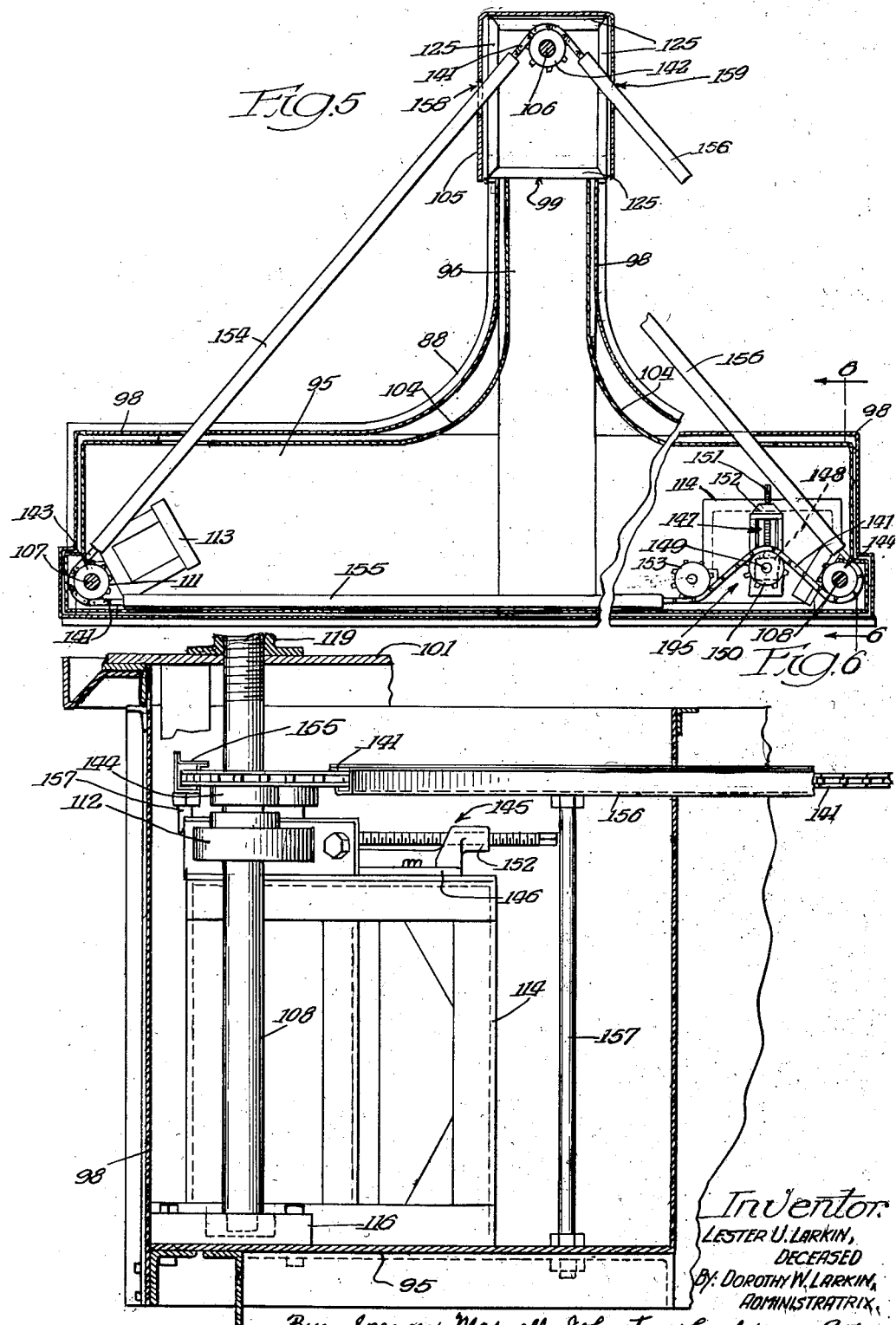

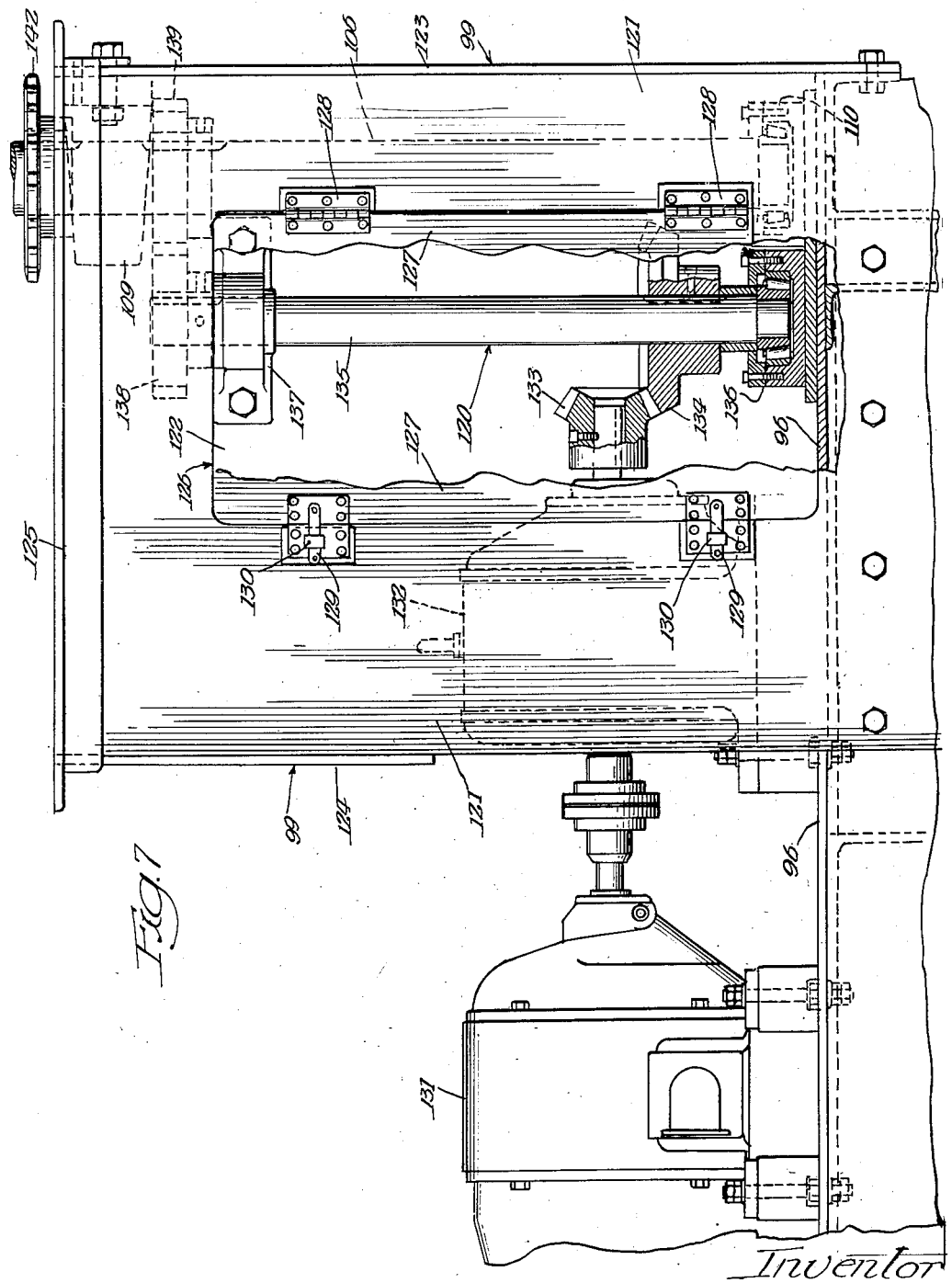

March 17, 1953 L. U. LARKIN 2,631,557
MACHINE FOR MAKING REFRIGERATOR LINERS
Filed Nov. 29, 1949 22 Sheets-Sheet 6
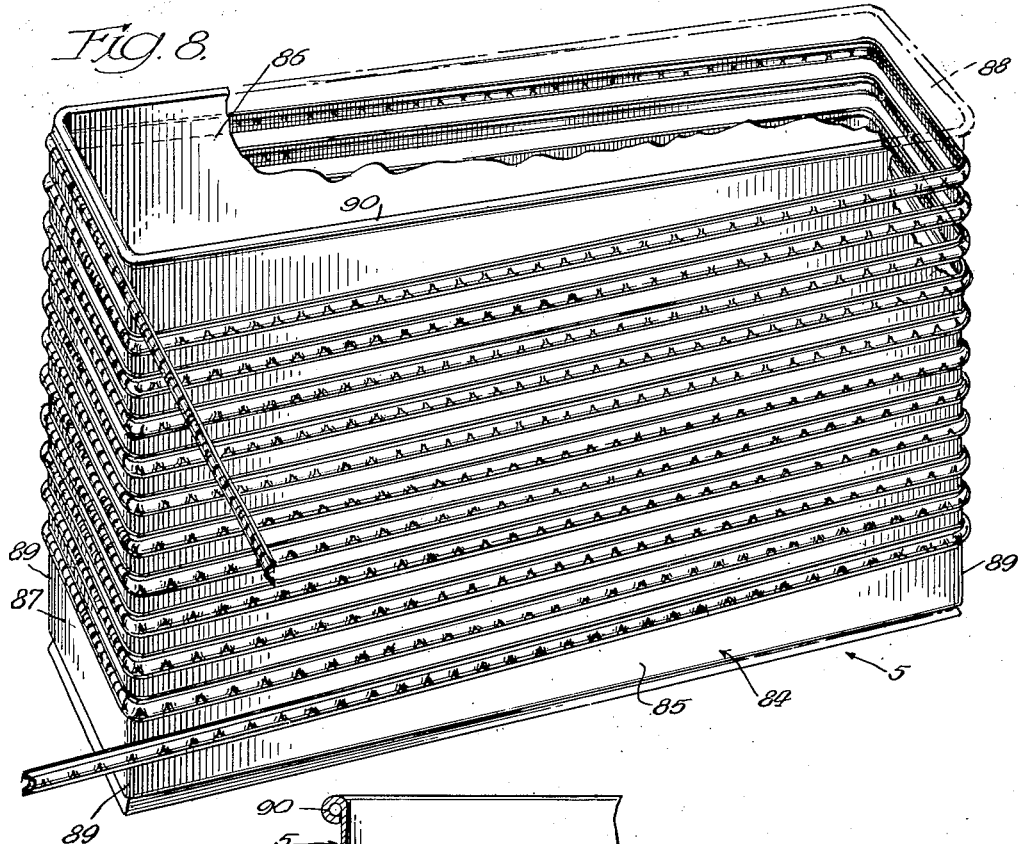
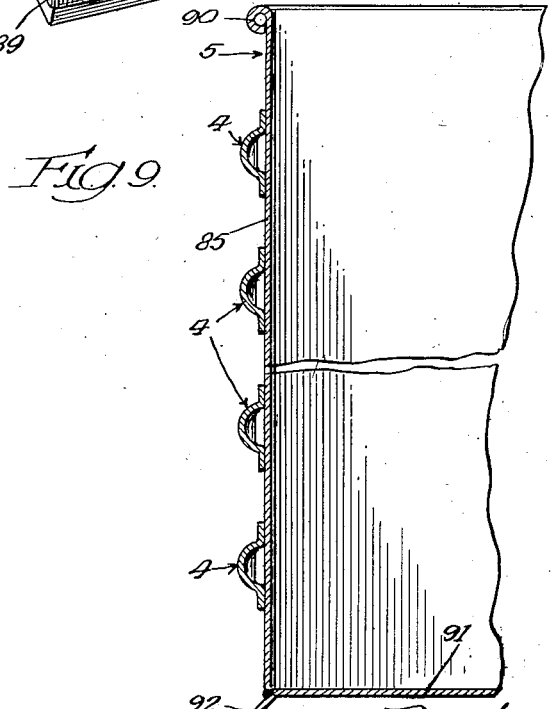
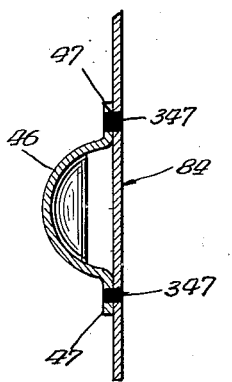
Inventor
LESTER U. LARKIN, DECEASED
By: DOROTHY W. LARKIN, ADMINISTRATRIX.
By: Spencer, Marzall, Johnston & Cook
Attys March 17, 1953 L. U. LARKIN 2,631,557
MACHINE FOR MAKING REFRIGERATOR LINERS
Filed Nov. 29, 1949 22 Sheets-Sheet 7
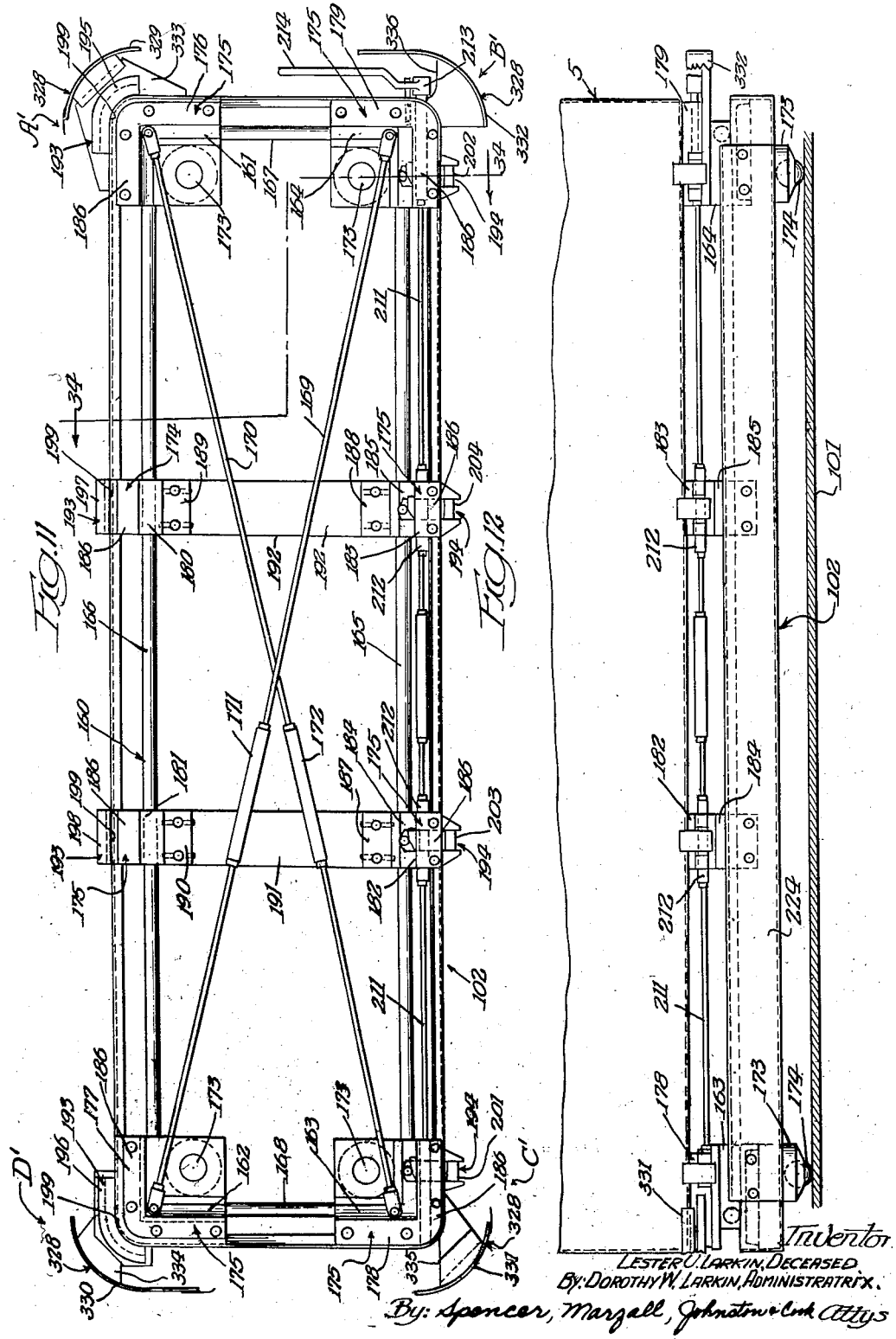
Inventor
LESTER U. LARKIN, DECEASED
By: DOROTHY W. LARKIN, ADMINISTRATRIX
By: Spencer, Marzall, Johnston & Cook Attys

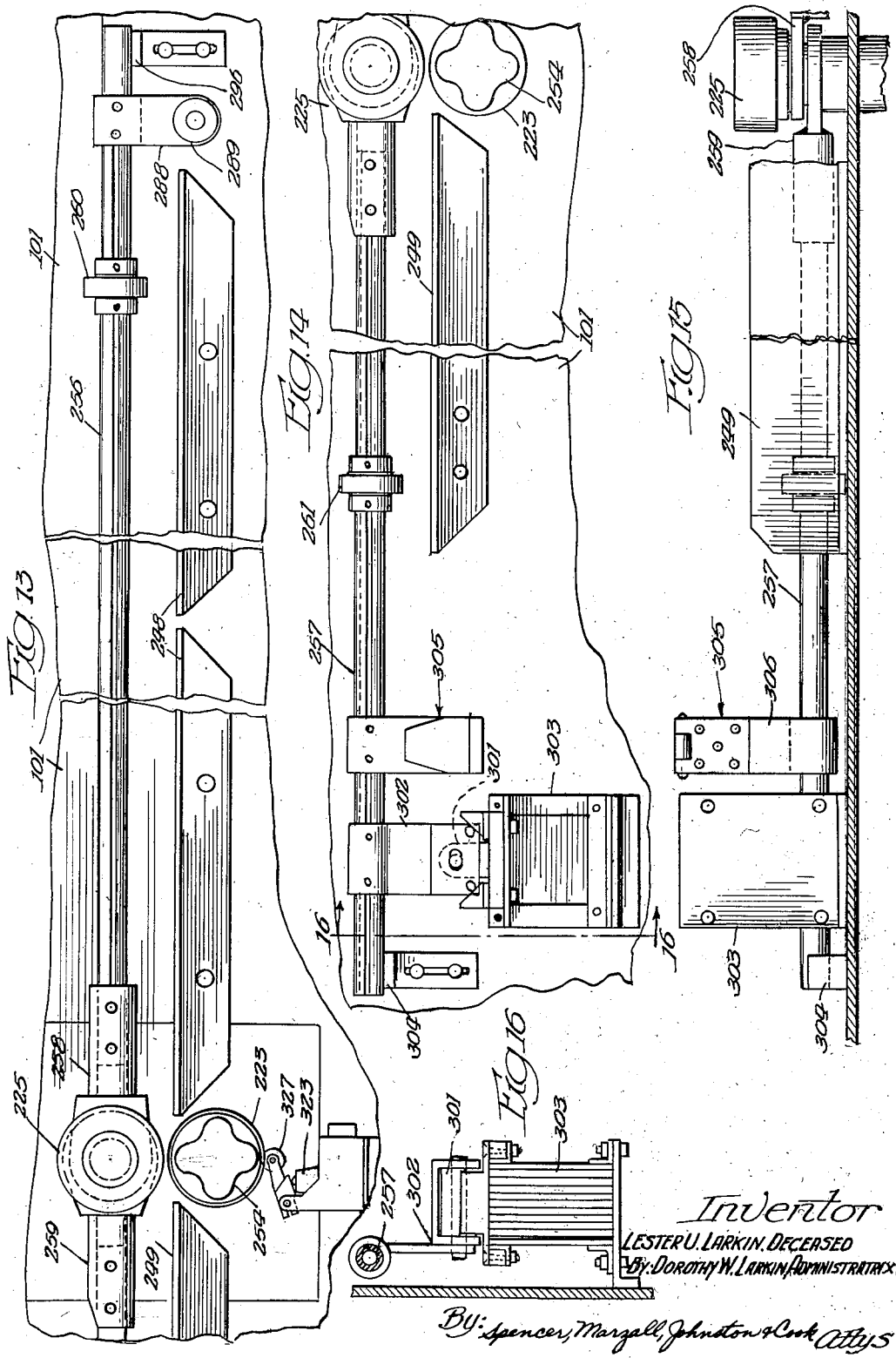

March 17, 1953  L. U. LARKIN  2,631,557
MACHINE FOR MAKING REFRIGERATOR LINERS
Filed Nov. 29, 1949  22 Sheets-Sheet 9
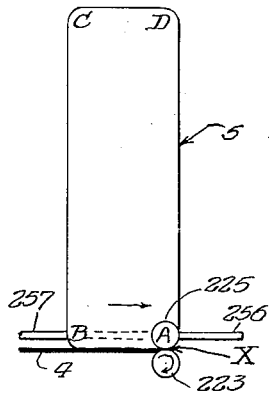
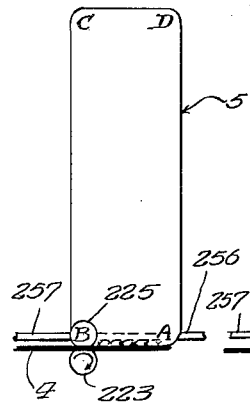
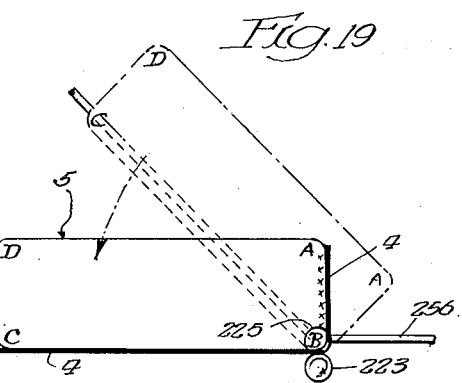
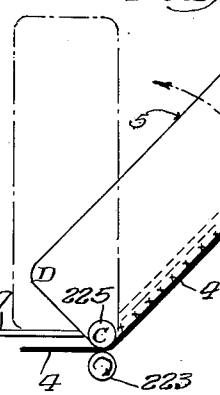
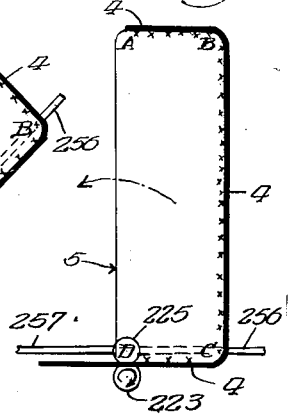
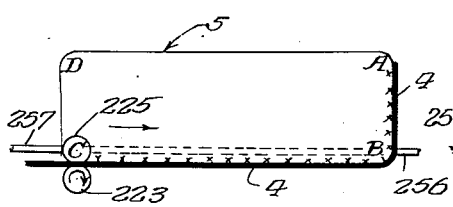
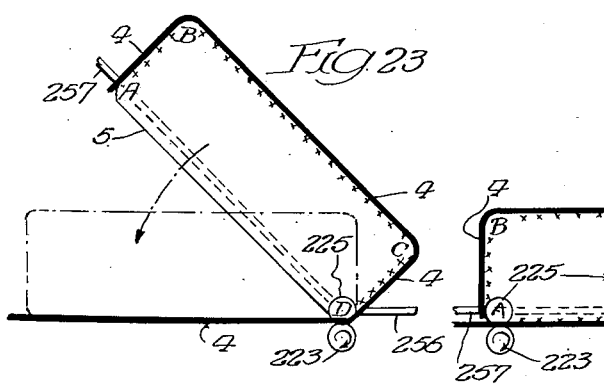
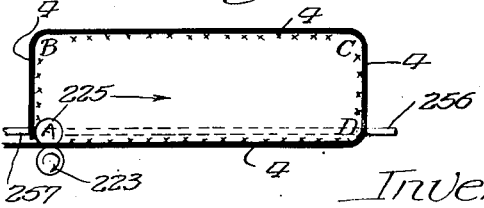
Inventor
LESTER U. LARKIN DECEASED
By: DOROTHY W. LARKIN, ADMINISTRATRIX.
By: Spencer, Marzall, Johnston & Cook
Attys March 17, 1953 L. U. LARKIN 2,631,557
MACHINE FOR MAKING REFRIGERATOR LINERS
Filed Nov. 29, 1949 22 Sheets-Sheet 10
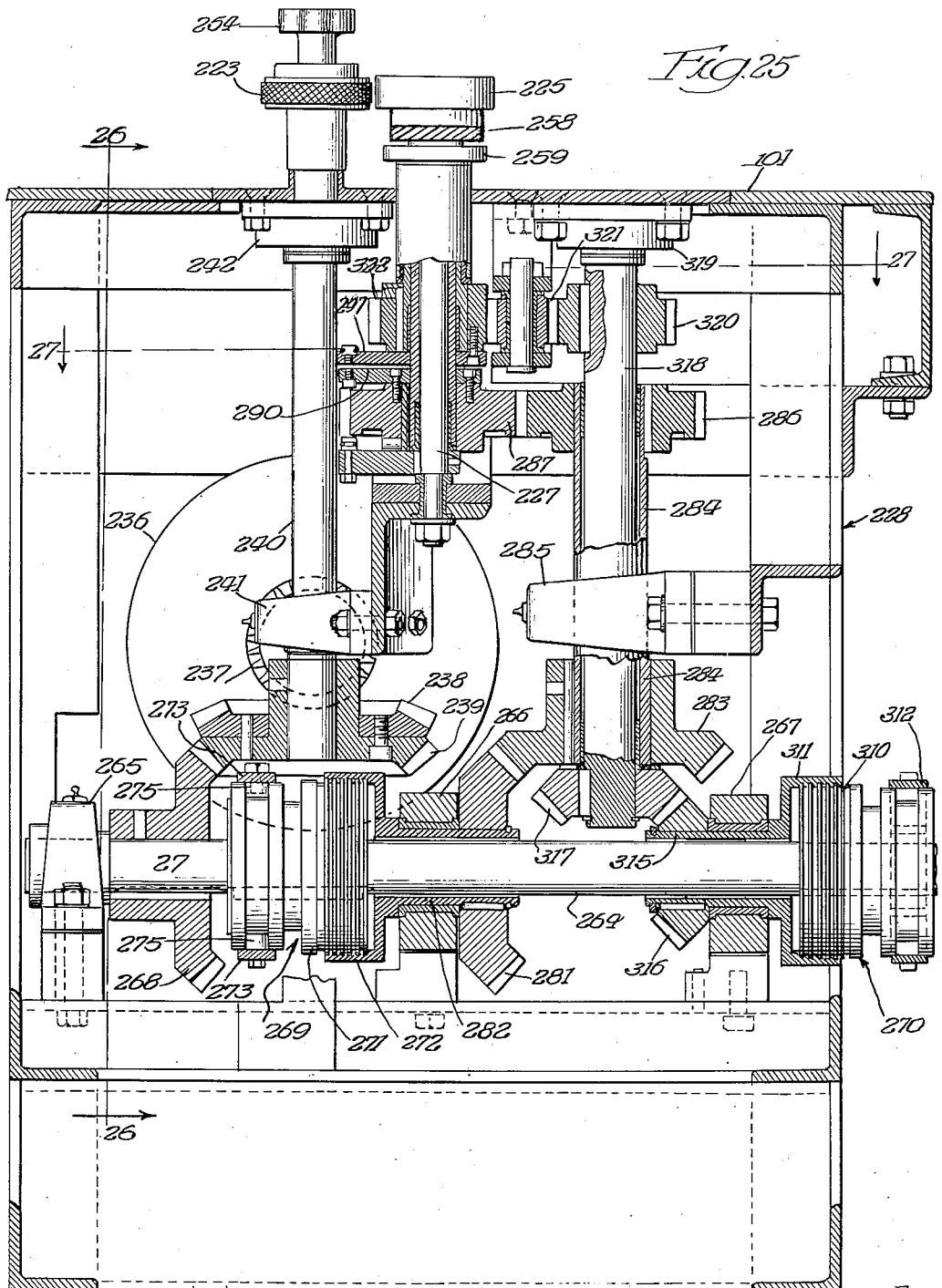
Inventor
LESTER U. LARKIN, DECEASED
BY: DOROTHY W. LARKIN, ADMINISTRATRIX.
By: Spencer, Marzall, Johnston & Cook
attys March 17, 1953 — L. U. LARKIN — 2,631,557
MACHINE FOR MAKING REFRIGERATOR LINERS
Filed Nov. 29, 1949 — 22 Sheets-Sheet 11

Inventor
LESTER U. LARKIN, DECEASED
By: DOROTHY W. LARKIN, ADMINISTRATRIX
By: Spencer, Marzall, Johnston & Cook
Attys

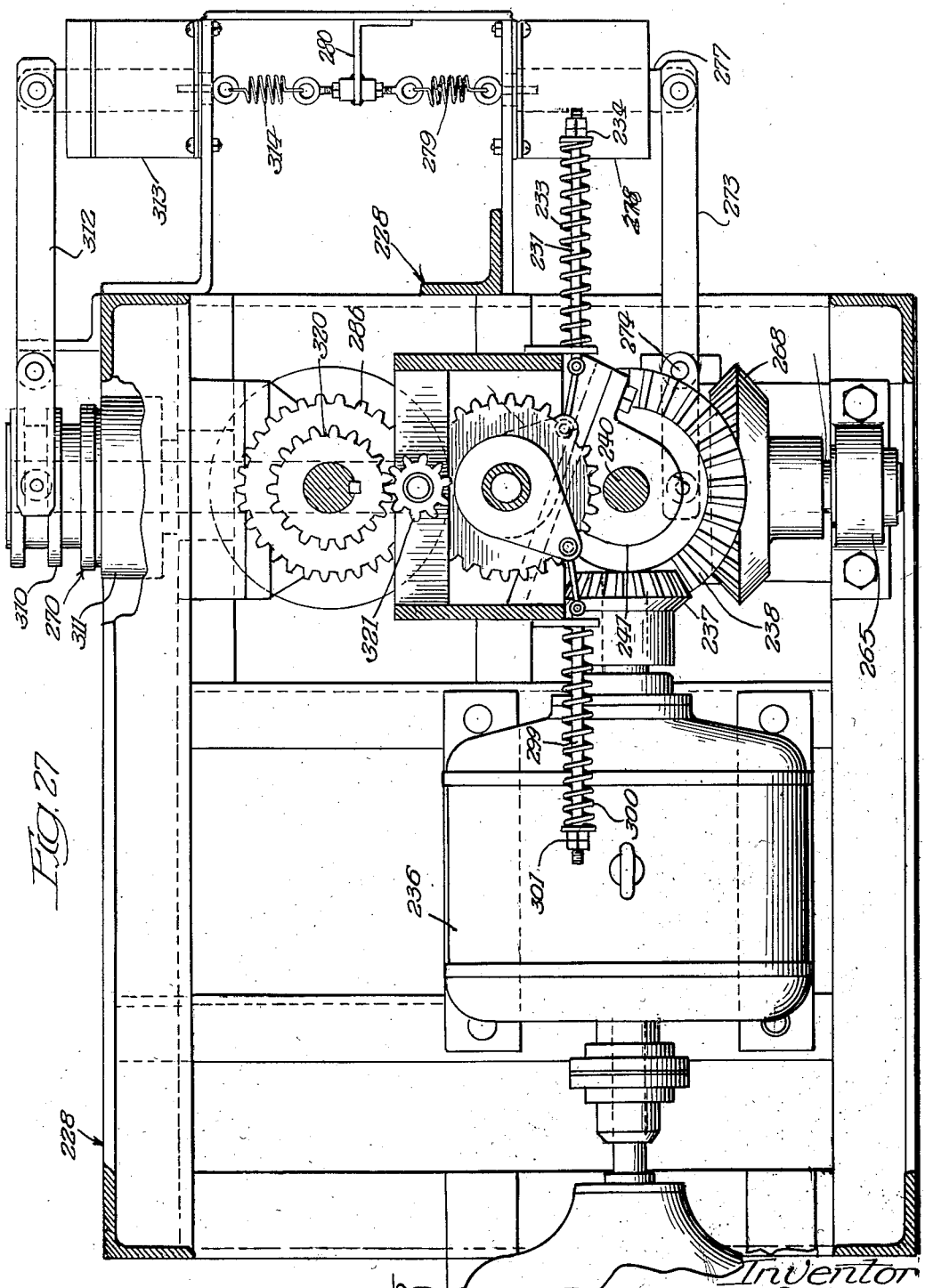

March 17, 1953 L. U. LARKIN 2,631,557
MACHINE FOR MAKING REFRIGERATOR LINERS
Filed Nov. 29, 1949 22 Sheets-Sheet 13
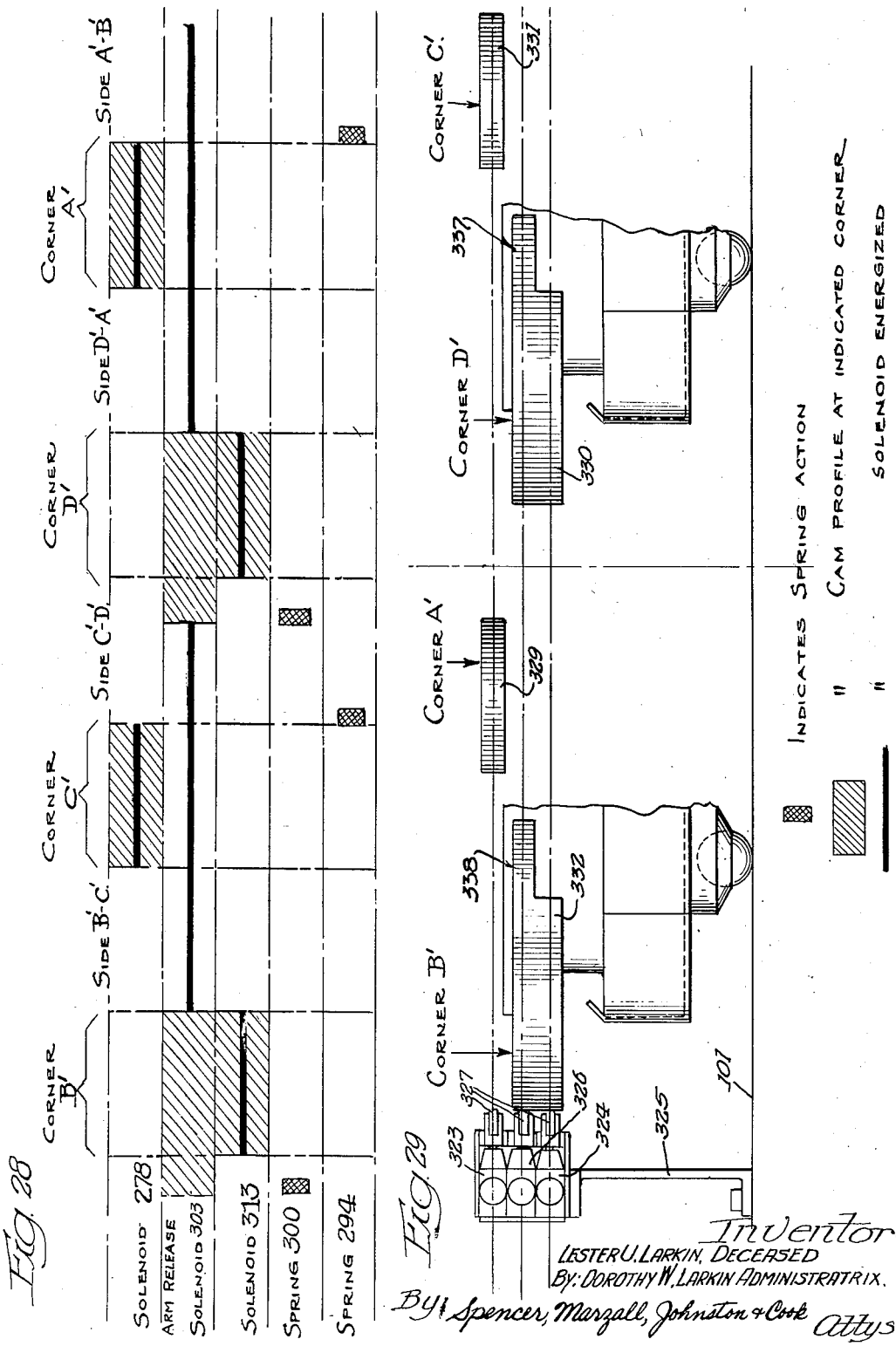

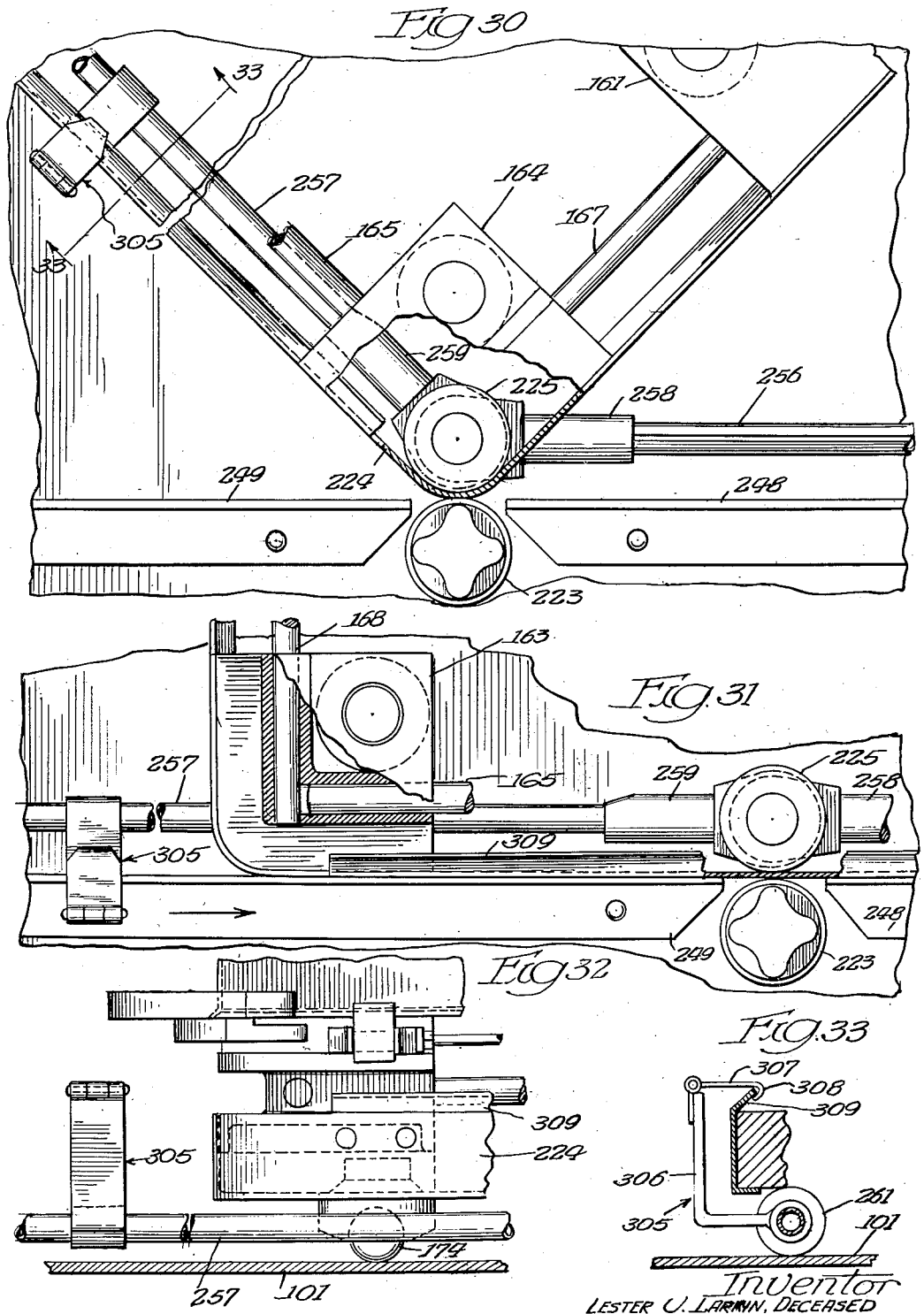

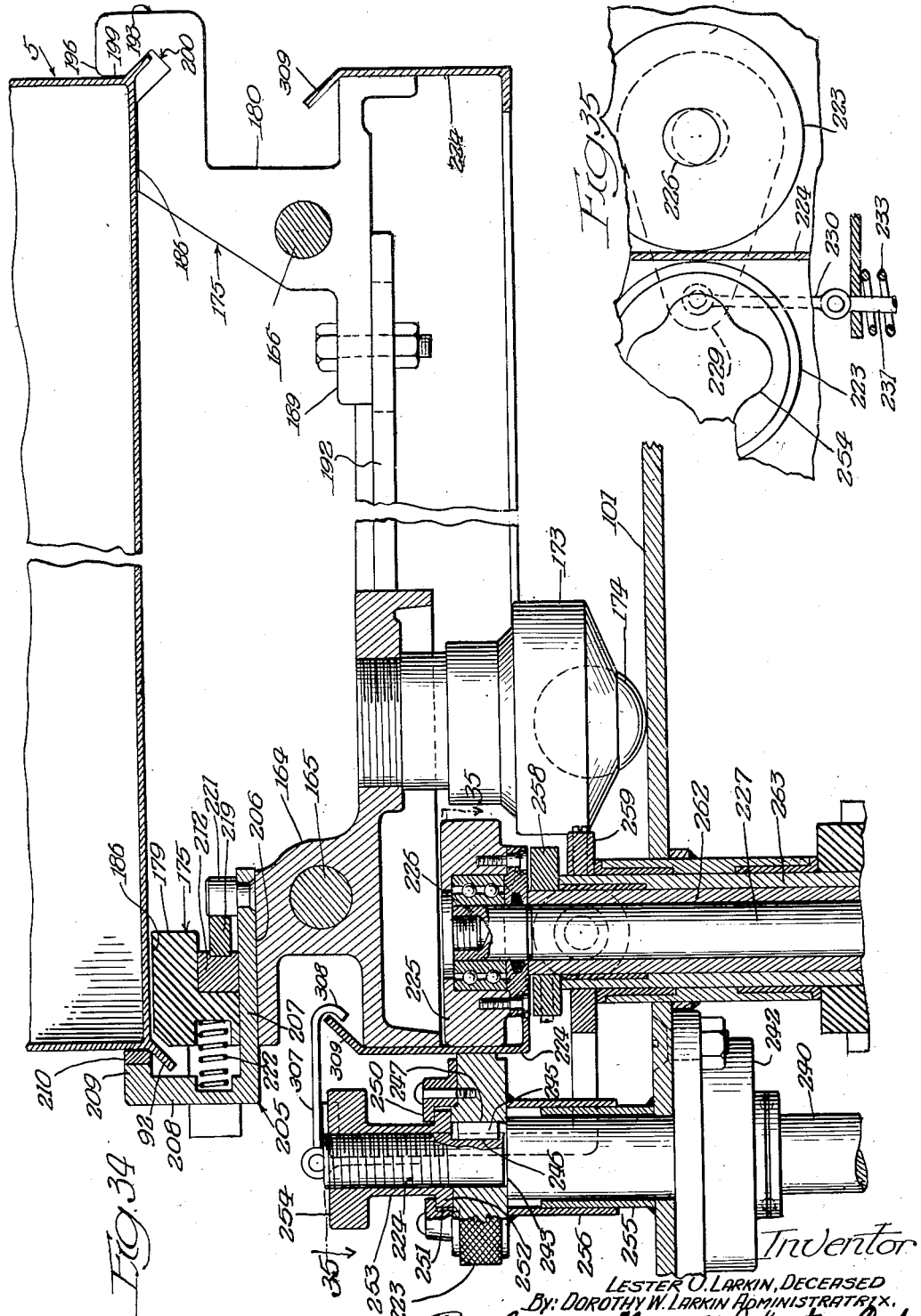

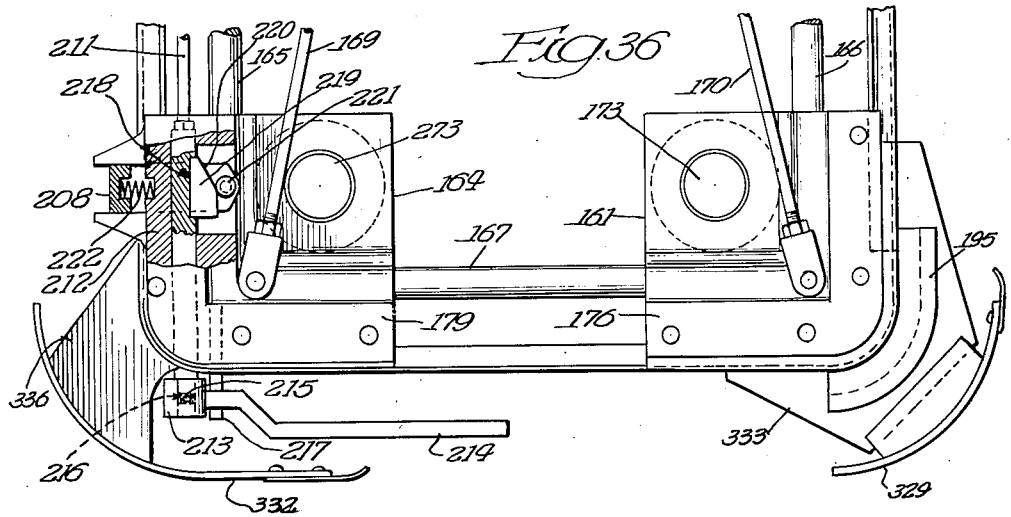
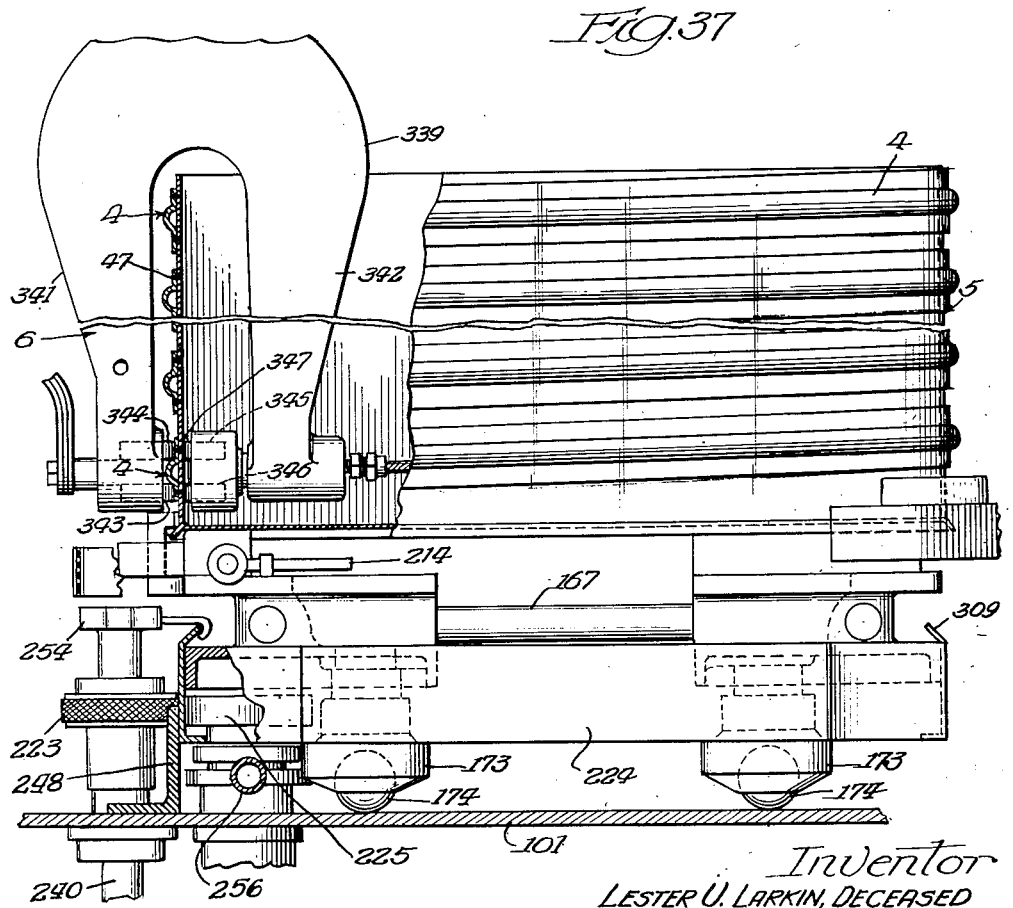

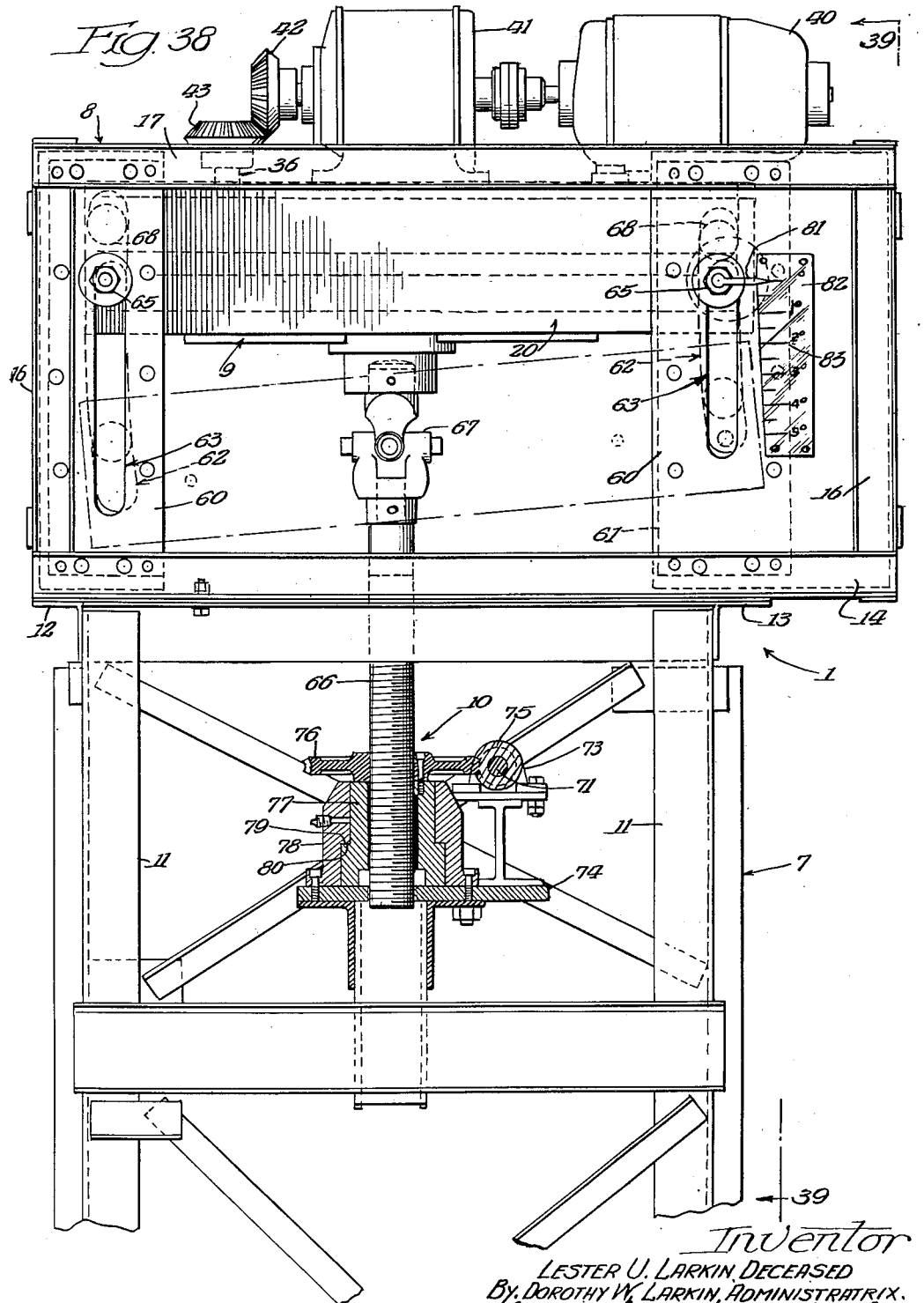

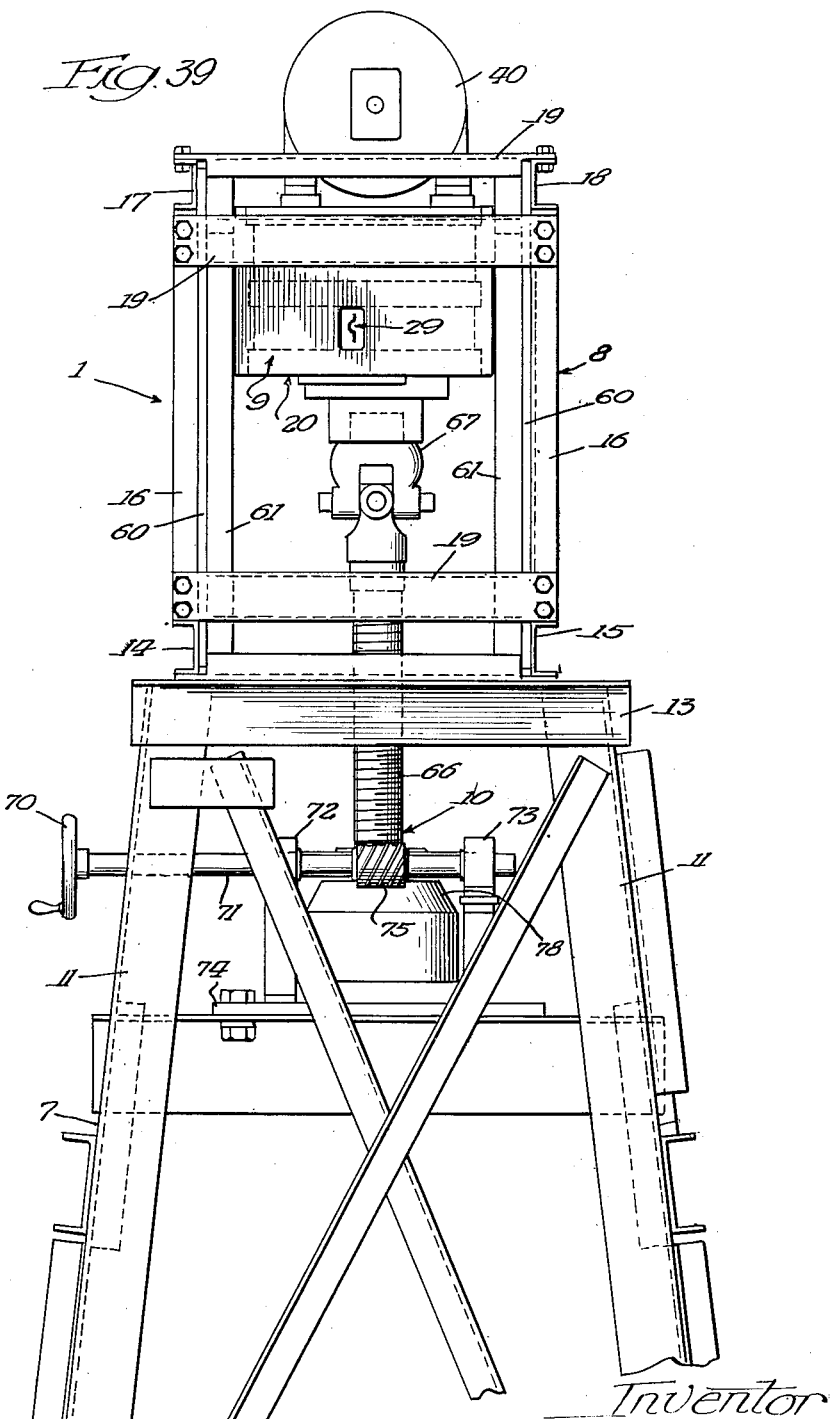

March 17, 1953 — L. U. LARKIN — 2,631,557
MACHINE FOR MAKING REFRIGERATOR LINERS
Filed Nov. 29, 1949 — 22 Sheets-Sheet 19
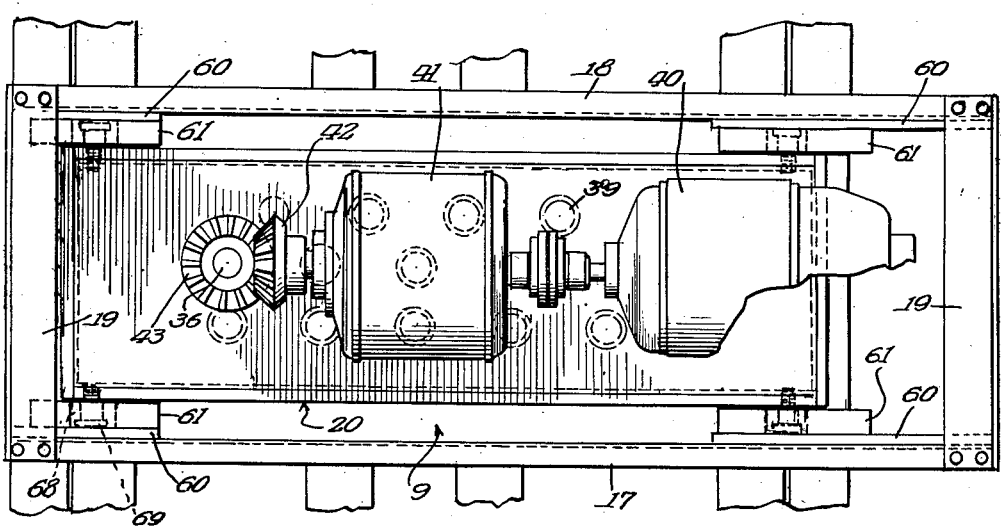
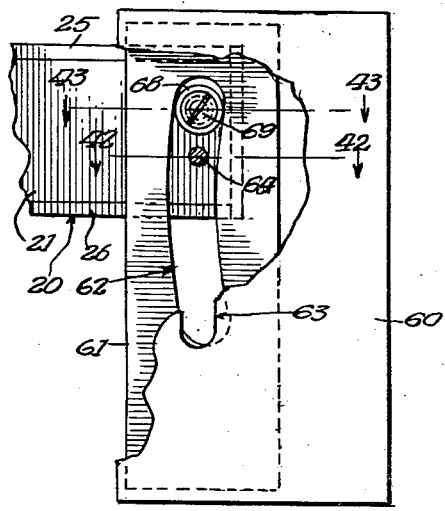
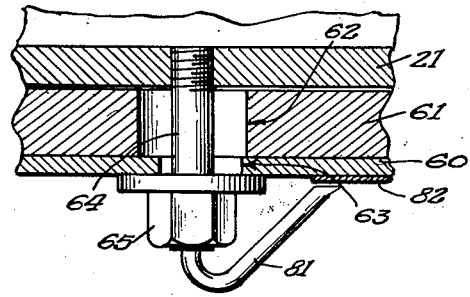
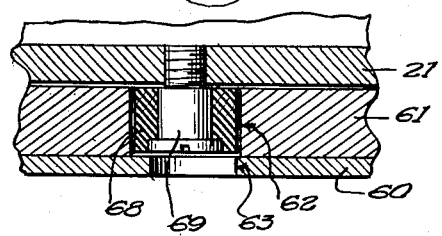
Inventor
LESTER U. LARKIN, DECEASED
BY DOROTHY W. LARKIN, ADMINISTRATRIX.
By: Spencer, Marzall, Johnston & Cook, Attys

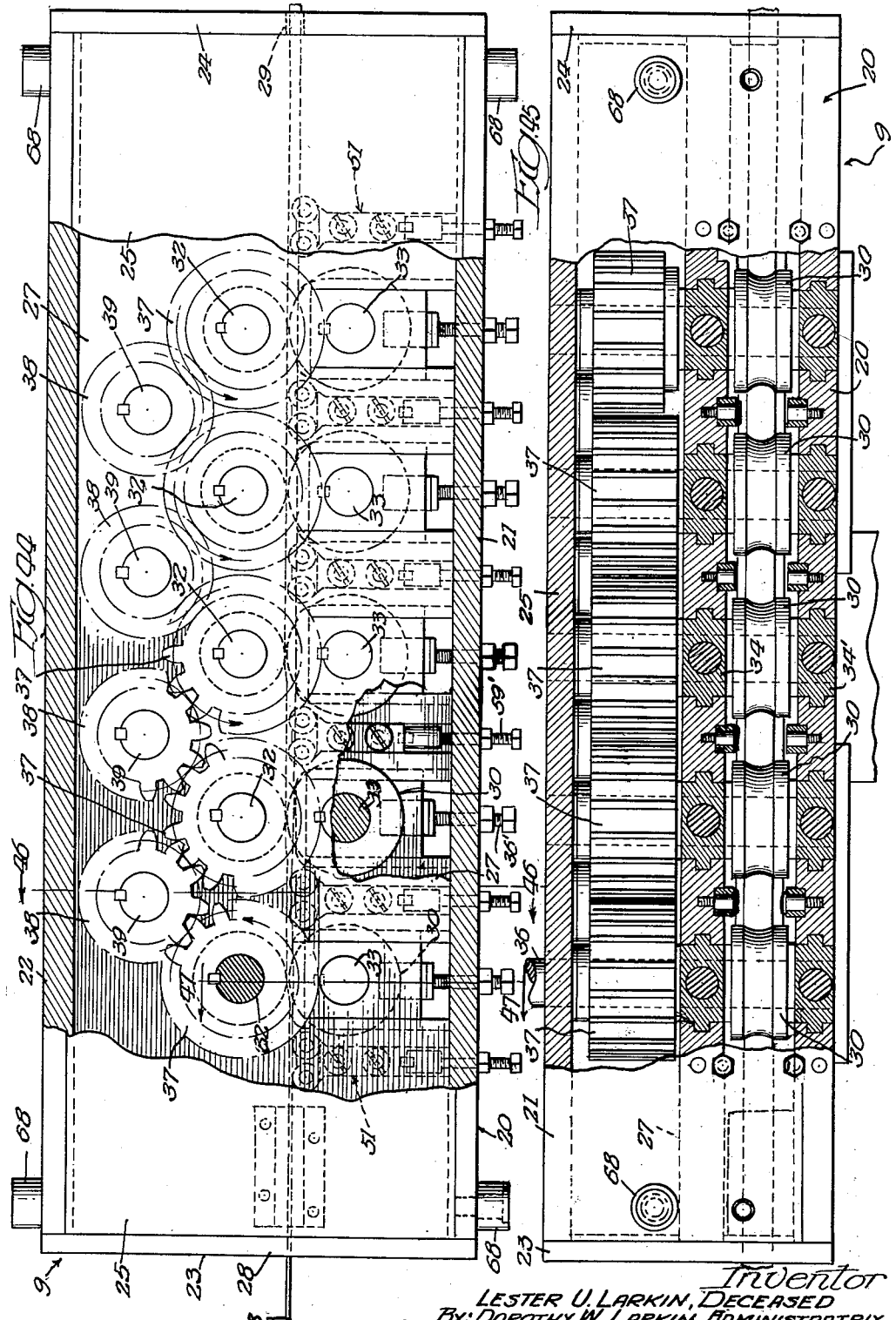

March 17, 1953   L. U. LARKIN   2,631,557
MACHINE FOR MAKING REFRIGERATOR LINERS
Filed Nov. 29, 1949   22 Sheets-Sheet 21
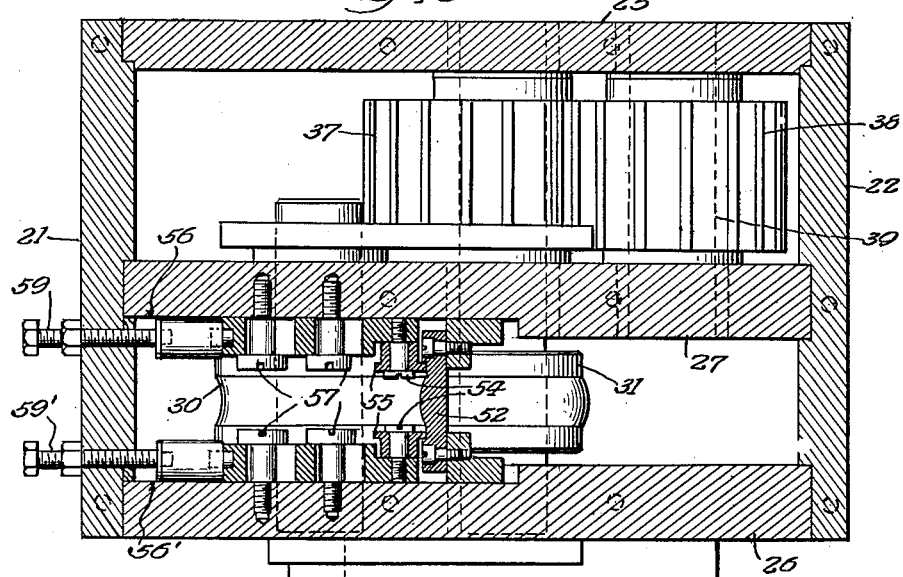
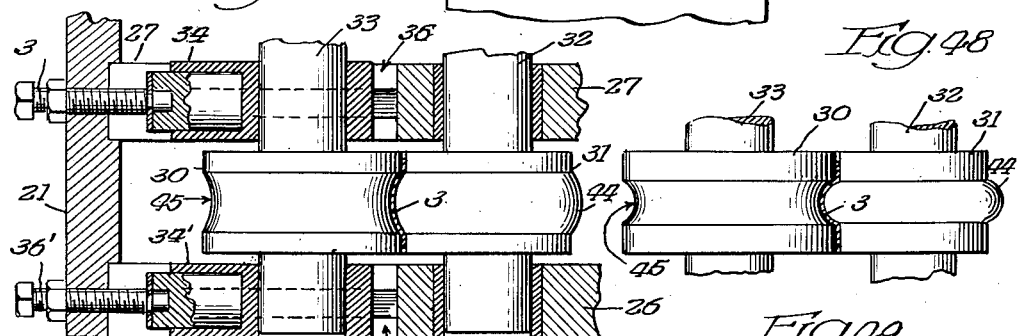
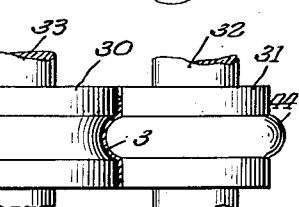
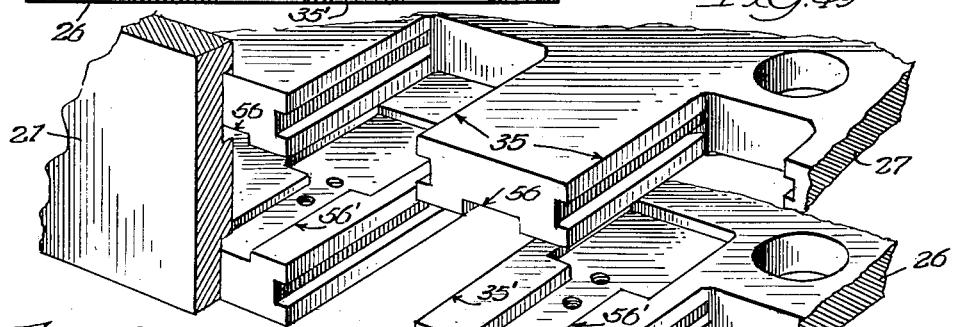
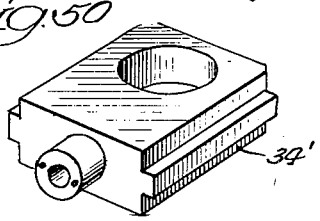

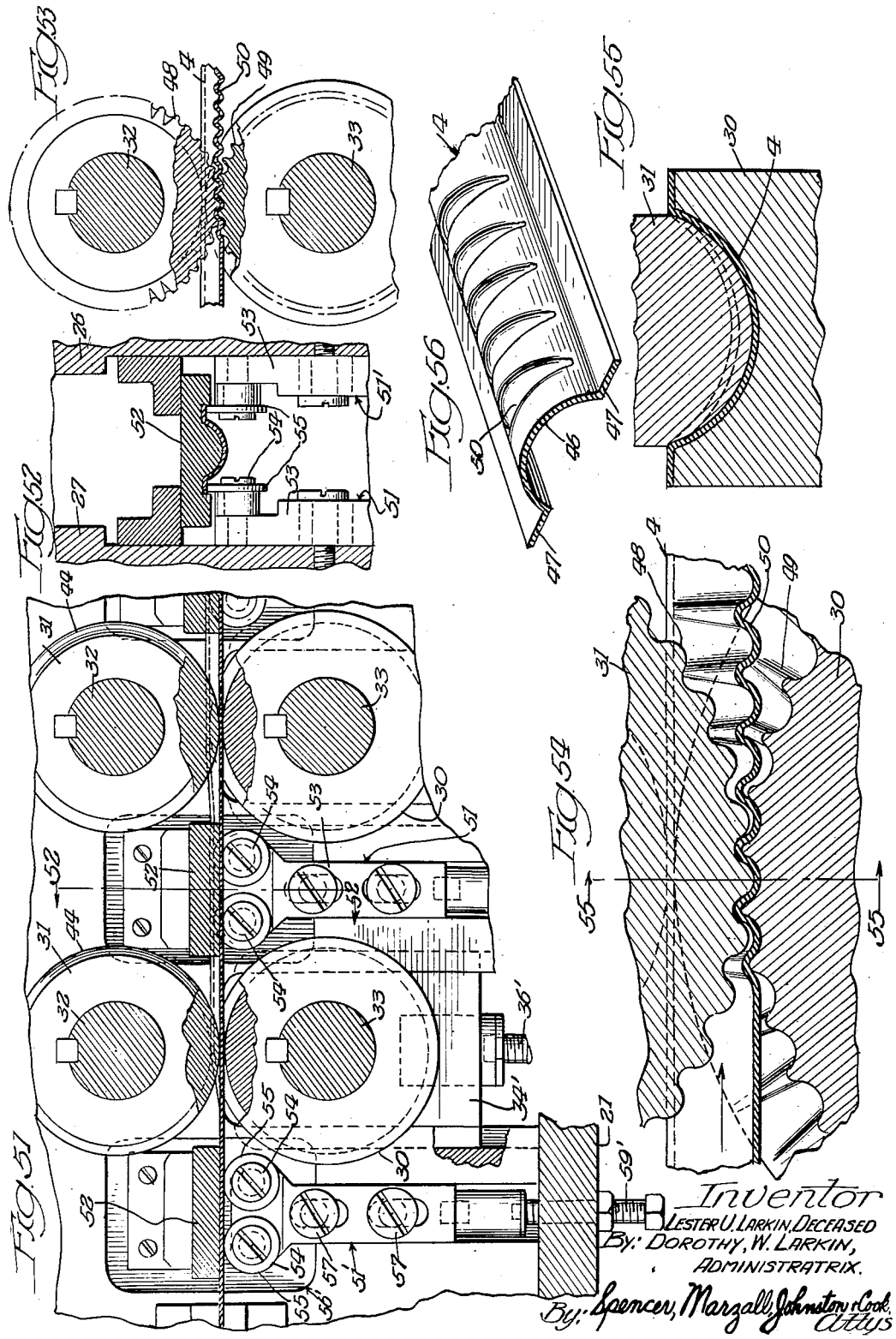

Patented Mar. 17, 1953

2,631,557

UNITED STATES PATENT OFFICE 2,631,557

MACHINE FOR MAKING REFRIGERATOR LINERS

Lester U. Larkin, deceased, late of Harvey, Ill., by Dorothy W. Larkin, administratrix, Arlington Heights, Ill.

Application November 29, 1949, Serial No. 130,036

7 Claims. (Cl. 113—59)

This invention relates to a device or machine for making or fabricating evaporators of the type having refrigerant flowing thereabout for the purpose of cooling the contents thereof, and to the method of making such evaporators.

An important object of the present invention is to provide an automatically operating machine for making and forming evaporators of both small and large sizes, but in larger quantities and at a very low cost, the evaporators comprising containers or liners having a helically wound conduit formed thereabouts in a continuous operation.

Another important object of the invention is to provide a production machine embodying new and improved means for simultaneously elevating and rotating a container or liner and applying a hat-shaped conduit strip to the container or liner while the latter is being elevated and rotated, whereby the conduit strip will assume a helical path around the outer surfaces of the liner.

Other important objects of the invention reside in the provision of (1) a machine for applying a new type of hat-shaped conduit strip as disclosed in the co-pending application of Lester U. Larkin, Serial No. 91,070, filed May 3, 1949, now Patent Number 2,595,472, granted May 6, 1952, there being new and improved means provided for accurately feeding the strip to the container or liner by the engagement of feeding means positively engageable with corrugations formed in the crown of the strip, the said corrugations in the strip also effecting proper increased turbulence to the refrigerant when flowing in the passage defined by the body of the strip and the outside surface of the container or liner, as shown in the said co-pending application; (2) new and improved means for effecting simultaneous vertical movement of the container or liner as well as rotary movement thereof while the conduit strip is being applied thereto; (3) novel means for welding the outer edges of the conduit strip to the container; (4) the novel method of forming an evaporator from a container by the application to the container of a specific type of conduit strip, which method comprises various steps of forming the conduit strip, feeding the conduit strip and applying the same to position while the container is moving and is rotating, and simultaneously welding the conduit strip in place on the container; and (5) a new arrangement and location of parts and the proper correlation and synchronization thereof to provide the proper making and forming of containers of large and small sizes at a relatively high production rate and at an extremely low cost.

Numerous other objects and advantages will be apparent throughout the progress of the specification which follows.

According to a preferred embodiment of the invention, the machine comprises two principal units, namely, a rolling mill for forming a conduit strip, and a coil or strip winding unit for winding the conduit strip about a container to form a complete heat exchanger for use in refrigeration. The rolling mill embodies a plurality of rotatable strip-forming rolls which are adapted to form a flat, elongated strip of metal into hat-shaped formation, the completed or formed strip incorporating attaching legs and a corrugated top surface. The completed strip, which is hereinafter called the "conduit strip," is completely formed as it emerges from the rolling mill and is then fed to the coil or strip winding unit.

The coil or strip winding unit automatically winds or coils the pre-formed conduit strip on the outer surfaces of a hollow liner or container so as to provide a conduit or refrigerant passage for the flow of fluid refrigerant about the enclosing walls of the liner. In order to effect the winding of the conduit strip around the liner, the coil or strip winding unit includes a table structure embodying a table top upon which there is mounted a truck for carrying the liner. The table structure supports certain operable mechanism, including a pair of rollers which clampingly engage therebetween a track carried by the truck and disposed on the periphery thereof. The rollers are continuously rotated to cause the truck to move along the table top in the same direction as that in which the conduit strip is being fed, whereby the conduit strip is drawn successively along the outer surface of each of the vertical walls of the liner. In order that the conduit strip may be brought around the corners of a square or rectangular liner, one or the other of a pair of arms carried by the table structure swings the truck through a 90° arc along the table top whenever a corner of the track on the truck passes between the aforesaid rollers. During these operations, the table structure is elevated continuously so that the conduit strip is threaded in a helical path around the liner. The conduit strip includes a pair of opposite outwardly extending flanges, and while the conduit strip is being wound onto the liner by the coil or strip winding unit, the said flanges are seam welded to the walls of the liner. The result is that a conduit or passage between the hat-shaped conduit strip and the outer surface of the liner is provided, through which conduit or passage a fluid refrigerant may flow to cool or freeze foodstuffs or other articles in the liner after the liner has been mounted in, and forms a part of, a refrigerator or freezer.

The machine and method of the present invention are for the purpose of making low priced liners or containers in production quantities, the liner and the conduit strip being shown in the co-pending application of Lester U. Larkin, Serial No. 91,070, filed May 3, 1949, now Patent No. 2,595,472, granted May 6, 1952.

The present invention, as to its organization and its method of operation, will best be understood from the following description of a specific embodiment when read in connection with the accompanying drawings, in which Fig. 1 is a front elevational view of a machine constructed in accordance with the principles of the invention;

Fig. 2 is a top plan view of the machine;

Fig. 3 is an end view of the strip winding unit of the machine, and showing the table structure of the strip winding unit in a raised position, certain parts being broken away for the sake of clearness;

Fig. 4 is an end view similar to Fig. 3 but showing the table structure in its lowered position, certain parts being broken away for the sake of clearness;

Fig. 5 is a horizontal sectional view on line 5—5 of Fig. 1, and showing the strip winding unit;

Fig. 6 is a vertical sectional view on line 6—6 of Figure 5, and showing part of the table structure in section;

Fig. 7 is an elevational view showing the elevating mechanism for raising the table structure of the strip winding unit, parts being broken away for the sake of clearness;

Fig. 8 is a perspective view of one form of liner having a conduit strip wound thereabout by means of the machine of the present invention;

Fig. 9 is a fragmentary transverse vertical sectional view of the liner shown in Fig. 8;

Fig. 10 is an enlarged detail sectional view showing the manner in which the conduit strip is affixed to a wall of the liner;

Fig. 11 is a top plan view of the truck which carries the liner on the strip winding unit;

Fig. 12 is a side view of the truck and showing a liner mounted in position thereon;

Fig. 13 is a fragmentary top plan view showing one of the arms for pivoting the truck on the table top of the table structure, parts being broken away;

Fig. 14 is a fragmentary top plan view showing the other arm for pivoting the truck, and the solenoid for holding the same;

Fig. 15 is a front elevational view of the structure shown in Fig. 14;

Fig. 16 is a sectional view on line 16—16 of Fig. 14;

Figure 26:
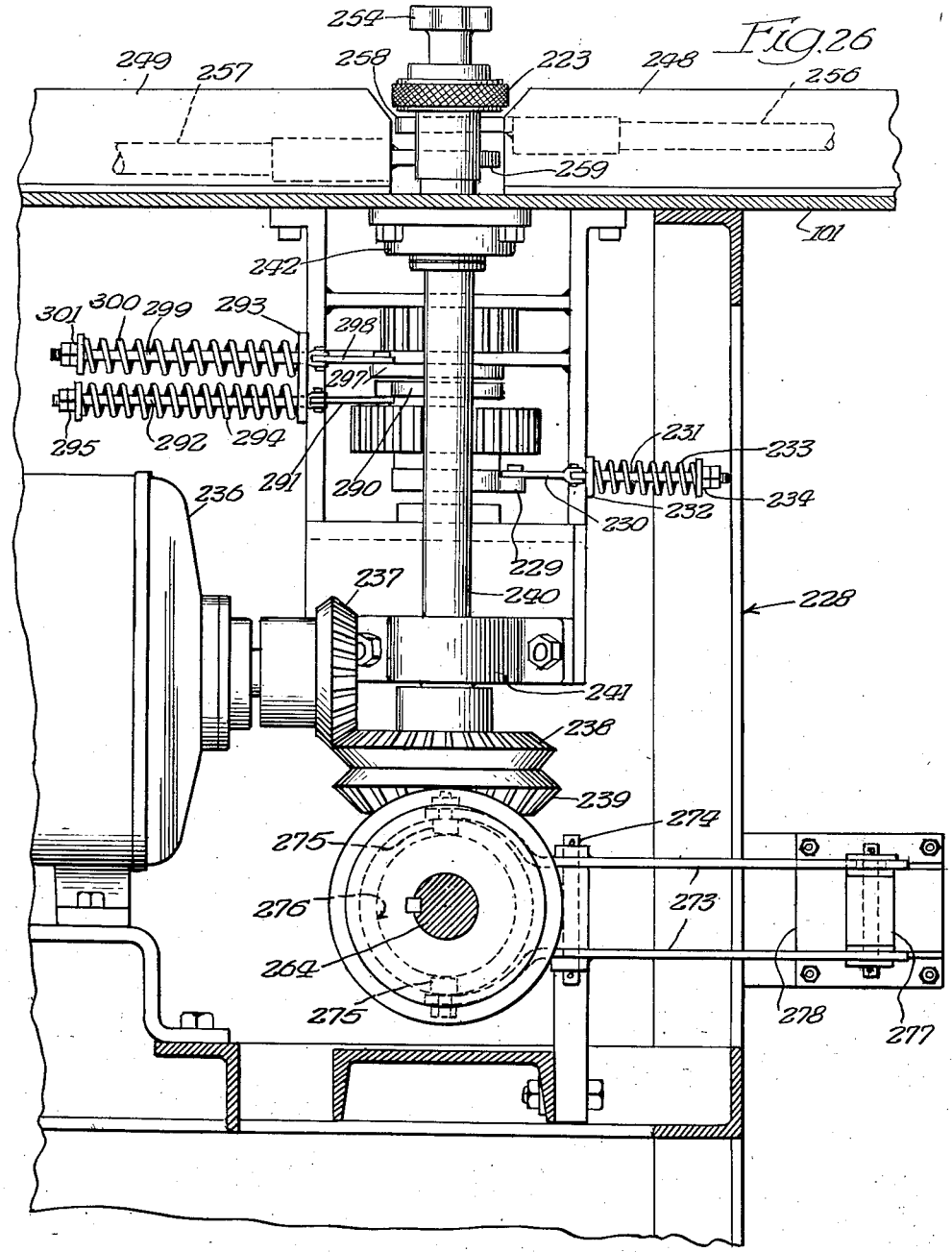

Figs. 17 to 24, inclusive, are diagrammatic views showing the manner in which the truck and liner are alternately moved and rotated during operation of the strip winding unit in order to wind the conduit strip on the liner;

Fig. 25 is a detail vertical sectional view on line 25—25 of Fig. 2 and illustrating the mechanism which operates the arms for swinging the truck;

Fig. 26 is a detail vertical sectional view on line 26—26 of Fig. 25;

Fig. 27 is a detail horizontal sectional view on line 27—27 of Fig. 25;

Fig. 28 is a chart illustrating the operation of certain operable components of the strip winding unit;

Fig. 29 is a developed view showing the cooperation between the cams on the truck and the switches for energizing the various electric control solenoids at predetermined intervals;

Fig. 30 is a fragmentary top plan view showing the drive and pressure rollers in engagement with one of the corners of the track on the truck, this view also showing the manner in which the truck is pivoted about these rollers through a 90° arc; certain parts are broken away for the shake of clearness;

Fig. 31 is a fragmentary top plan view showing the drive and pressure rollers engaging the track at one side of the truck;

Fig. 32 is a side elevational view of certain parts of the structure illustrated in Fig. 31;

Fig. 33 is a vertical sectional view on line 33—33 of Fig. 30;

Fig. 34 is an enlarged detail vertical sectional view on line 34—34 of Fig. 11 and also showing in vertical section the driving roller and pressure roller in driving engagement with one side of the truck, and the means by which a liner is held on the truck;

Fig. 35 is a fragmentary detail top view on line 35—35 of Fig. 34 and showing the track being clamped between the drive roller and the pressure roller;

Fig. 36 is a fragmentary detail top plan view of one end of the truck, parts being broken away to show the construction of the elements adapted for holding a liner on the truck;

Fig. 37 is a detail elevational view, partly in section, showing the truck mounted on the table top of the table structure, the truck being positioned between the drive roller and the pressure roller, the view also showing a liner mounted in position on the truck and welding apparatus for welding the conduit strip to the liner;

Fig. 38 is a side elevational view of the rolling mill, certain parts thereof being shown in section;

Fig. 39 is an end elevational view on the line 39—39 of Fig. 38;

Fig. 40 is a fragmentary top plan view of the rolling mill, certain parts being broken away for the sake of clearness;

Fig. 41 is an enlarged detail view of one corner of the rolling mill and illustrating the means for guiding the angular and vertical movement of the roll housing assembly in its supporting framework;

Fig. 42 is a detail sectional view on line 42—42 of Fig. 41;

Fig. 43 is a detail sectional view on line 43—43 of Fig. 41;

Fig. 44 is a top plan view of the roll housing assembly, certain parts being broken away and other parts being shown in section for the sake of clearness;

Fig. 45 is a side view of the roll housing assembly, certain parts being broken away for the sake of clearness;

Fig. 46 is a transverse sectional view on line 46—46 of Fig. 44;

Fig. 47 is a fragmentary detail sectional view on line 47—47 of Fig. 44;

Fig. 48 is a detail elevational view showing one pair of strip-forming rolls, and the manner in which a strip is formed therebetween, the strip being shown in section;

Fig. 49 is a fragmentary perspective view of certain parts of the roll housing;

Fig. 50 is a perspective view of a bearing block for supporting one end of one of the pressure roll shafts;

Fig. 51 is a fragmentary detail top view showing certain of the pressure roll adjustment apparatus and certain of the strip gripping devices in the roll housing assembly;

Fig. 52 is a sectional view on line 52—52 of Fig. 51;

Fig. 53 is a top view of the pair of final or corrugating rolls in the rolling mill, parts thereof being broken away for the sake of clearness;

Fig. 54 is an enlarged view of certain of the elements shown in Fig. 53;

Fig. 55 is a sectional view on line 55—55 of Fig. 54; and

Fig. 56 is a fragmentary perspective view of a finished, completely formed conduit strip.

The particular embodiment herein shown for the purpose of illustrating the invention comprises two main units, namely, a rolling mill 1 and a strip winding unit or strip winder 2 (Figs. 1 and 2). The rolling mill 1 is provided for the purpose of forming a flat strip of metal 3, or other suitable material, into a hat-shaped conduit strip 4, and then feeding the conduit strip 4 to the strip winder 2. The rolling mill 1 is adapted to form the conduit strip 4 which is described and claimed in the aforesaid co-pending application Serial No. 91,070, filed May 3, 1949, by Lester U. Larkin. The strip winding unit or strip winder 2 is employed for simultaneously rotating and elevating a container or liner member 5 while certain welding apparatus 6 (Fig. 1) welds the conduit strip 4 to the outside of the container or liner member 5. As a result of the concurrent operations of the rolling mill 1 and the strip winder 2, the conduit strip 4 will coil around the liner member 5 to provide a heat exchanger such as is disclosed in the aforesaid co-pending application.

Rolling mill 1

The rolling mill 1 is positioned preferably at one side of the strip winder 2 in order that the conduit strip 4 will be fed in the proper direction from the rolling mill 1 to the strip winding unit or strip winder 2.

The rolling mill 1 (Figs. 38 and 39) comprises a pedestal 7, a framework 8 mounted on the pedestal 7, and a roll housing assembly 9 carried by the framework 8. The roll housing assembly 9 includes mechanism for forming the conduit strip 4 from the flat strip 3. An adjusting device 10 is provided to facilitate vertical adjustment of the roll housing assembly 9 for controlling the vertical angle at which the formed and shaped conduit strip 4 leaves the rolling mill unit 1. The pedestal 7 is preferably of welded construction and may incorporate spaced legs 11 which are braced and held apart by means of a plurality of cross bars. A pair of spaced angle bars 12 and 13 is arranged at the upper end of the pedestal 7, the bars 12 and 13 being carried by the legs 11. The angle bars 12 and 13 are provided for supporting the framework 8.

The framework 8 may include a pair of spaced lower side channel bars 14 and 15 which are secured to the angle bars 12 and 13. The lower side channel bars 14 and 15, at their ends, support the lower ends of upright corner posts 16. The posts 16, at their upper end, support spaced upper side channel bars 17 and 18. The framework 8 is given lateral support by bracing bars 19 which extend across the ends and top of the framework 8.

The roll housing assembly 9 is mounted within the framework 8, as shown in Figs. 38 to 40. This roll housing assembly 9 consists of a box-shaped roll housing 20 and certain strip forming mechanism carried and supported thereby. The roll housing 20 preferably includes a pair of spaced side plates 21 and 22 which are secured at their opposite ends to a pair of spaced end plates 23 and 24. The roll housing 20 is closed at the top and bottom by a top plate 25 and by a bottom plate 26 respectively; a partition 27 for supporting certain parts of the strip-forming mechanism is positioned between the top plate 25 and the bottom plate 26. The flat strip 3 may enter the roll housing 20 by way of an inlet opening or slit 28 formed in the end plate 2 (Fig. 44). The finished conduit strip 4, which is formed from the flat strip 3 by strip forming means located in the roll housing 20, leaves the roll housing 20 by passing through a hat-shaped discharge opening or slit 29, Figs. 37 and 44, provided in the end plate 24 and axially aligned with the inlet opening 28.

The flat strip 3 is adapted to be motivated through the roll housing 20 and, simultaneously, formed or bulged into shape to form the hat-shaped conduit strip 4. The forming and motivation of the conduit strip 4 is accomplished by a plurality of strip-forming rolls which are disposed in the roll housing 20 between the partition 27 and the bottom plate 26. These strip-forming rolls are arranged in the roll housing 20 in roll pairs which are spaced longitudinally in the housing 20, each of said roll pairs comprising a pressure roll 30 and a drive roll 31 cooperating and corresponding therewith. Each drive roll 31 is securely mounted on a vertical rotatable shaft 32 journaled in the top plate 25, the bottom plate 26 and the partition 27 of the roll housing 20, there being a separate shaft 32 for each drive roll 31.

Each pressure roll 30 is mounted for shiftable horizontal movement toward or away from the drive roll 31 of the same pair, such movement, when accomplished, being in a transverse direction with respect to the roll housing 20. To facilitate such shiftable movement, each pressure roll 30 is rotatably mounted on a vertical shaft 33 which is carried at its ends by a pair of shiftable bearing blocks 34 and 34'. The two bearing blocks 34 and 34' for each pressure roll 30 are positioned one above the other, the bearing blocks 34 being slidably mounted in guideways 35 formed in the partition 27 of the roll housing 20 and the bearing blocks 34' being slidably mounted in guideways 35' formed in the bottom plate 26 of the roll housing 20. Each of the bearing blocks 34 may be shifted in its associated guideway 35 by means of an adjusting screw 36 threaded through the side plate 21 of the roll housing 20, Figs. 44 and 47. Similarly, each of the bearing blocks 34' may be shifted in its associated guideway 35' by means of an adjusting screw 36' threaded through the side plate 21, Figs. 44 and 47. In order to shift a particular pressure roll 30 toward or away from its corresponding drive roll 31, therefore, the two adjusting screws 36 and 36' for that roll 30 are adjusted separately.

To thread the flat strip 3 through the several pairs of rolls 30 and 31 the pressure rolls 30 are each individually shifted away from their corresponding drive rolls 31 by manually turning the several adjusting screws 36 and 36' in the proper direction. The flat strip 3 is then fed manually into the roll housing 20 by way of the inlet opening 28. As the flat strip 3 is fed through the housing 20, it will pass between the pressure roll 30 and drive roll 31 of each of the successive pairs of strip-forming rolls 30 and 31. After the flat strip 3 has been fed between the pressure roll 30 and the drive roll 31 of every pair of strip forming rolls, the adjusting screws 36 and 36' are manually turned in the opposite direction until each pressure roll 30 presses the flat strip 3 into full transverse frictional contact with the corresponding drive roll 31. Each pressure roll 30, therefore, is shiftable so that it may be made to bear against one face of the flat strip 3 in order to maintain the other face of the strip in frictional contact with the corresponding drive roll 31.

Means are provided for rotating the drive rolls 31 in unison and in the same direction, so that the flat strip 3, having been clamped between the pressure roll 30 and the drive roll 31 of each strip-forming roll pair, may be progressively formed or shaped by the pressure rolls 30 and their respective cooperating drive rolls 31. To this end, each of the shafts 32 has a gear 37 secured thereon. The gears 37 are interconnected with each other by means of idler gears 38 which are mounted on vertical shafts 39 journaled, at their ends, in the top plate 25 and the partition 27 of the roll housing 20. This gear train, comprising the gears 37 and the idler gears 38, is adapted to be driven by an electric motor 40 rigidly fastened to the top plate 25 of the roll housing 20, Figs. 38 and 40. The rotor shaft of the motor 40 is coupled to the input shaft of a gear-type speed reducer 41 secured to the top plate 25 of the roll housing 20. The output shaft of the speed reducer 41 carries a bevel gear 42 which meshes with a bevel gear 43 secured on the upper end of one of the shafts 32. When the electric motor 40 is energized, rotational power is transmitted from the rotor shaft of the motor 40 to the several drive rolls 31, through the medium of the speed reducer 41, the bevel gears 42 and 43, and the gear train comprising the gears 37 and the idler gears 38. The drive rolls 31 will thereby rotate in unison, and in the same direction, and, in turn, will cause the strip 3 to move through the several pairs of strip forming rolls.

The drive rolls 31 and the pressure rolls 30 are provided with means for forming or bulging the flat strip 3 into the hat-shaped configuration of the conduit strip 4. Such means includes an annular rounded ridge 44, Figs. 47 and 48, formed on the center portion of the periphery of each drive roll 31, and an annular rounded groove 45 formed in the center portion of the periphery of each pressure roll 30. The radial height of the annular ridges 44 on the respective drive rolls 31 becomes progressively greater from the drive roll nearest the end plate 23 of the roll housing 20 to the drive roll nearest the end plate 24 of the roll housing 20. Similarly, the radial depth of the annular grooves 45 in the pressure rolls 30 becomes progressively greater from the pressure roll nearest the end plate 23 to the pressure roll nearest the end plate 24. When the motor 40 causes the drive rolls 31 to rotate, the central portion of the strip 3 will be bulged progressively as it passes between the several ridges 44 and the grooves 45 cooperating therewith. The strip bulging operation just described, produces the transversely rounded central portion 46 of the conduit strip 4; it also results in a pair of integral flanges 47 extending from the opposite sides of the central rounded portion 46 (see Fig. 56).

Transverse notches or grooves 48 may be provided in the ridge 44 on the drive roll 31 nearest the end plate 24, for the purpose of forming corrugations in the central, transversely rounded or bulged portion 46 of the conduit strip 4. For the same purpose, transverse notches or grooves 49 may also be formed in the final pressure roll 30. As the strip 3 is fed between the final pair of strip forming rolls, the cooperating series of notches or grooves 48 and 49 will corrugate the central rounded portion 46 of the conduit strip 4, as indicated at 50, Figs. 53, 54 and 56. It may be noted that the aforedescribed corrugation operation furnishes the equivalent of a rack and gear. Motive power thus may be transferred, without slippage, from the final drive roll 31 to the conduit strip 4, so that the conduit strip 4 may be fed to the strip winder 2 at a speed which varies directly with the operating speed of the motor 40.

A plurality of strip tensioning devices 51 and 51' (Figs. 44, 46, 51 and 52) are provided in the roller housing 20 for guiding the strip 3 and for preventing the said strip from buckling as it moves between adjacent pairs of strip-forming rolls. The strip tensioning devices 51 and 51' are arranged in pairs, the tensioning device 51 of each pair being disposed directly above the tensioning device 51' of the same pair. The several pairs of strip tensioning devices 51 and 51' are further arranged so that one pair is positioned before, and one pair after, each strip forming roll pair, as clearly shown in Fig. 44. Pressure blocks 52 rigidly attached to the partition 27 and the bottom plate 26, are associated with each pair of strip tensioning devices 51 and 51', the pressure blocks 52 being positioned at one side of the strip 3 whereas the strip tensioning devices 51 and 51' are positioned at the other side of the strip 3. The strip engaging surface of each pressure block 52 is preferably configurated to conform with the shape of the strip 3 as it is being formed by the preceding pair of strip forming rollers.

Each strip tensioning device 51 and 51' includes a T-shaped bar 53 which carries a pair of studs 54 upon which compression rollers 55 are rotatably mounted. Each bar 53 is slidably mounted in a T-shaped recess or slot, there being a first series of recesses 56 formed in the partition 27 to receive the bars 53 of the strip tensioning devices 51, there being also a second series of recesses 56' formed in the bottom plate 26 to receive the bars 53 of the strip tensioning devices 51'. The bars 53 are retained in their respective recesses 56 and 56' by means of shouldered studs 57 screw-threaded in the partition 27 and the bottom plate 26, Figs. 46 and 51. These studs 57 pass through slots 58 provided in the bars 53, the slots 58 being elongated (Fig. 46) to permit the individual strip tensioning devices 51 to be shifted in a direction normal to the direction of strip feed. The compression rollers 55 of each of the strip tensioning devices 51 and 51' may be brought into rolling engagement with the strip 3, after the said strip has been threaded through the strip-forming roll pairs, by means of a set screw 59 or 59' screw-threaded through the side plate 21 of the roll housing 20 and connected at its inner end to the outer end of the corresponding bar 53. When a set screw 59 or 59' is turned in the proper direction, the compression rollers 55 are pressed against one side of the strip 3 so as to force the other side of the strip 3 into frictional engagement with the pressure block 52. This arrangement permits the operator to adjust the longitudinal tension in the strip 3 as the latter is being formed or bulged by means of the roll pairs, so that the strip 3 will not buckle as it is motivated through the roll housing 20.

So that it may support the roll housing 20, the framework 8 is provided with four vertical plates 60. Two of these plates 60 are disposed at one side of the framework 8, being fastened at their upper and lower ends to the lower and upper side channels 14 and 17, respectively. The other two plates 60 are disposed at the opposite side of the framework 8 and are fastened at their lower and upper ends to the lower and upper side channels 15 and 18, respectively. A cam block 61 having a curved cam slot 62 formed therein is fastened to the inner face of each plate 60. The cam slot 62 in each cam block 61 is positioned in substantial alignment with a straight vertical slot 63 formed in the adjacent plate 60, Figs. 41, 42 and 43. Studs 64, secured at their inner ends in the side plates 21 and 22 of the roll housing 20, project outwardly from the housing 20 and pass through the respective aligned pairs of cam slots 62 and slots 63, as clearly shown in Fig. 42. Each stud 64 has a nut 65 threaded on its outer end. When all of the nuts 65 are tightened against the outer faces of the plates 60 adjacent thereto, the roll housing 20 is rigidly locked to, and supported by, the framework 8.

The rolling mill 1 is provided with means for adjusting the vertical angle at which the conduit strip 4 is fed to the strip winder 2. This adjustment is essential because the angle at which the conduit strip 4 is to be wound upon the liner member 5 depends, in part, upon the vertical angle at which the conduit strip 4 leaves the rolling mill 1. To this end, an adjusting device 10 is incorporated in the rolling mill 1.

The adjusting device 10 affords means for regulating the vertical angle of the roll housing 20, whereby the vertical angle at which the conduit strip 4 emerges from the roll housing 20 may be controlled. The adjusting device 10 comprises a vertical screw-threaded height control rod 66 which is connected, at its upper end, to the bottom plate 26 of the roll housing 20 by means of a universal joint or coupling 67. The universal coupling 67 is connected to the roll housing 20 at a point located slightly to the left of the center of the roll housing, as viewed in Fig. 38. When the height control rod 66 is moved downwardly in an axial direction from the position shown in Fig. 38, its off-center connection with the roll housing 20 causes the housing 20 to tilt, whereby that end of the housing from which the conduit strip 4 emerges (the right-hand end, Fig. 38) will be elevated above the end into which the flat strip 3 is fed (the left-hand end, Fig. 38). The roll housing 20 is guided in such tilting action by guide rollers 68, which are rotatably mounted on shouldered studs 69 projecting outwardly from the side plates 21 and 22 of the roll housing. The guide rollers 68 are positioned in the respective cam slots 62 whereby the roll housing 20 may be tilted uniformly as the height control rod 66 is being either raised or lowered. The several guide rollers 68 and their corresponding cam slots 62, therefore, guide the roll housing 20 when the latter is moved to any predetermined angular position with respect to the framework 8.

The height control rod 66 may be raised or lowered to adjust the angular position of the roll housing 20 by manually rotating a hand wheel 70 (Fig. 39) in the proper direction. This hand wheel 70 is pinned on the outer end of a horizontal shaft 71 which is supported by a pair of spaced bearings 72 and 73 projecting upwardly from a horizontal plate 74 rigid with the pedestal 7. A worm 75 is keyed on the shaft 71 between the bearings 72 and 73, and this worm 75 meshes with a worm wheel 76. The worm wheel 76 is mounted on the height control rod 66 and is internally threaded to have engagement with the threads on the height control rod 66; thus, the worm wheel 76 functions as a nut on the height control rod 66. The worm wheel 76 is bolted to a shoulder block 77, which is surrounded by a housing 78 and by the plate 74, the former being bolted to the latter. An internal shoulder 79 is provided on the inner surface of the housing 78, this shoulder being disposed above an external shoulder 80 formed on the shoulder block 77. The shoulders 79 and 80, and the plate 74, function to prevent any endwise movement of the worm wheel 76.

The angular position of the roll housing 20 may be adjusted by first loosening the nuts 65 from tightened engagement with the plates 60. The hand wheel 70 is then manually rotated in the proper direction. Rotation of the hand wheel 70 causes the worm 75 to rotate the worm wheel 76, whereby the height control rod 66 will be raised or lowered, depending on the direction in which the hand wheel 70 is rotated. Raising the height control rod 66 will cause the roll housing 20 to move toward a horizontal position, whereas lowering of the height control rod 66 will cause the angular disposition, or tilt, of the roll housing 20 to increase. When the roll housing 20 has been brought to the desired angular position, the nuts 65 may be tightened against the plates 60 to prevent any subsequent accidental change in the angular setting of the roller housing.

It may be desired to provide means for indicating the angular position or tilt of the roll housing 20. For this purpose, a pointer 81 may be fastened to the outer end of one of the studs 64, as shown in Figs. 38 and 42. The free end of the pointer 81 points to a scale plate 82 affixed to the outer face of the plate 60 nearest the stud 64 which carries the pointer 81. The scale plate 82 preferably has suitable indicia 83 stamped or printed thereon to indicate, in connection with the pointer 81, any particular angle to which the roll housing 20 may be adjusted.

Operation of rolling mill 1

The rolling mill 1 may be operated by first turning the adjusting screws 36 and 36' to provide a considerable space between each pressure roll 30 and its associated drive roll 31. The adjusting screws 59 and 59' are then turned to provide a considerable clearance between each strip tensioning device 51 and its associated pressure block 52. Next, the vertical angle at which the conduit strip 4 is to be discharged from the roll housing 20 is set by first loosening the nuts 65 from tightened engagement with the plates 60 and then manually turning the hand wheel 70 until the pointer 81 points to the particular angle index, on the scale plate 82, which indicates the desired strip discharge angle. After the tilt of the roll housing 20 has been so set, the nuts 65 are tightened against their respective plates 60, whereby the roll housing 20 will be rigidly locked in the proper angular position within the framework 8. Next, one end of the flat strip 3 is inserted manually through the inlet opening 28 by the person operating the machine; the strip 3 is then fed manually between the strip forming rolls in the roll housing 20 until the leading end of the strip 3 emerges from the discharge opening 29 in the roll housing 20. The adjusting screws 59 and 59' are then turned manually in the opposite direction until the rollers 55 of each strip gripping device 51 have forced one side of the strip 3 into full engagement with the strip engaging surface of the corresponding pressure block 52. The strip 3 is then gripped between the respective pressure rolls 30 and their associated drive rolls 31 by turning the adjusting screws 35 and 35' in the proper direction. Finally, the electric motor 40 is energized, whereby the strip 3 will be motivated through the roll housing 20, and bulged into the shape of the conduit strip 4, by means of the several strip-forming rolls 30 and 31. The finished conduit strip 4 which is fed out of the roll housing 20 embodies the shape shown in Fig. 56. This conduit strip is discharged continuously through the discharge opening 29 in the roll housing 20, whereupon it is fed to the fixed or stationary welding apparatus 6, which welds the conduit strip 4 to the liner member 5 as the latter is manipulated, in a particular manner, by the strip winder 2.

*Container or liner member 5*

The liner member 5 (Figs. 8 and 9) which is adapted to be operated upon by the machine comprises a hollow body 84 which is open at its top so that foodstuffs and other items may be placed therein. The liner body 84 is substantially rectangular in horizontal cross-section and is preferably relatively high in comparison with its width. The liner body 84 is preferably constructed of sheet metal and comprises a pair of spaced vertical side walls 85 and 86 which are integrally joined at their ends to a pair of spaced vertical end walls 87 and 88; the corners formed by the integral junctures of these several walls are rounded, as indicated at 89. The top edges of the liner body 84 may be curled, as indicated at 90, in order to impart strength and rigidity to the liner. The bottom of the liner body 84 is closed by a bottom wall 91, Fig. 9, which is welded to the lower edges of the side walls 85, 86 and the end walls 87, 88. The liner body is provided with an angular downturned flange 92 which extends outwardly from the lower edges of the body. The purpose of this flange 92 will be hereinafter more fully disclosed by way of the following description of the strip winder 2.

*Strip winder 2*

The strip winder 2, which functions to wind the conduit strip 4 upon the liner member 5, comprises a base 93, which supports the various parts of the strip winder 2, and a table structure 94, which is adapted to be elevated above the base 93 (Figs. 1, 3 and 4). The base 93 is substantially T-shaped, consisting of a front part 95 and a rear part 96, which extends rearwardly from the central portion of the front part 95 (Fig. 5). A plurality of feet 97 are provided to support the base above the floor. The base preferably carries a skirt 98 for shielding the interior of the strip winder from dust, dirt, water, or other foreign matter which might impair the operation of the machine. The skirt 98 projects upwardly from the periphery of the base, and extends around the front part 95 of the base and rearwardly along both of the opposite sides of the base part 96 to an elevator frame 99 which is mounted on the rear end of the base part 96 (Fig. 5). The skirt 98 may be fabricated in any suitable manner, such as by fastening together the side edges of a plurality of sheet metal panels 100 (Fig. 1) which have been placed side by side, and then securing the lower ends of these panels 100 to the sides of the base 93.

The table structure 94 comprises a table top 101 which is adapted to support a truck 102 for carrying the liner 5. The table top 101 is flat and horizontal, and is preferably semi-circular in shape, as clearly shown in Fig. 2. A skirt 103 depends from the underside of the table top 101 and cooperates with the skirt 98 on the base 93 to shield the interior of the strip winder from dirt, dust, water and other foreign matter. The skirt 103 may consist of two parts 104 and 105, Fig. 5, which are of a sheet metal construction, similar to that of the skirt 98. The skirt part 104 is spaced inwardly a small distance from the skirt 98 on the base 93, and effectively extends the skirt 98 when the table structure is elevated. The skirting part 105 is arranged at the rear of the table structure 95 and is spaced a slight distance outwardly from the side and rear walls of the elevator frame 99. The interior of the strip winder, therefore, is always shielded by the skirt 98, the skirt 103 and the elevator frame 99, regardless of whether the table structure is disposed at either a raised, lowered, or intermediate position.

The table structure 94 is adapted to be raised or lowered with respect to the base 93 by means of three vertical, rotatable lifting screws 106, 107 and 108, Fig. 2. The lifting screw 106 is disposed at the rear of the strip winder 2, while the lifting screws 107 and 108 are disposed at the front of the strip winder. The rear lifting screw 106 is supported mediate its ends by means of a pillow block bearing 109 (Fig. 7) rigid with the elevator frame 99, and is supported at its lower end by a thrust bearing 110 mounted on the base part 96. The two front lifting screws 107 and 108 are supported mediate their ends by pillow block bearings 111 and 112, respectively, these bearings 111 and 112 being carried by pedestals 113 and 114, respectively, which are rigidly mounted on the opposite ends of the front base part 95 near the front corners thereof. The lower ends of the lifting screws 107 and 108 are supported by thrust bearings 115 and 116, respectively, mounted on the base part 95. The lifting screws 106, 107 and 108 pass through suitable openings in the table top 101 and have screw threaded engagement with nut members 117, 118 and 119 respectively, which are fixedly secured to the table top 101. The lifting screw 106 is geared to certain elevating mechanism 120 (Fig. 7) located mainly within the elevator frame 99 on the rear end of the base part 96. The other two lifting screws 107 and 108 are chain driven from the lifting screw 106, so that all of the lifting screws may rotate in unison to either raise or lower the entire table structure 94, including the table top 101. The extent of table rise is clearly shown in Figs. 3 and 4, Fig. 3 showing the table structure 94 in its lowermost position, and Fig. 4 showing the table structure in its uppermost position.

The elevator frame 99, Fig. 7 is provided for supporting certain components of the elevating mechanism 120. This elevator frame 99 preferably is of welded construction and includes a pair of spaced vertical side plates 121 and 122 which are rigidly fastened by bolts, or by any other suitable fastening means, to the opposite sides of the base part 96. The elevator frame 99 is closed at the rear by a plate 123 secured to the rear edges of the side plates 121 and 122. A front plate 124 is secured at its side edges to the front edges of the side plates 121 and 122; the lower edge of this front plate 124 is disposed about at a height equal to about one-half the height of the frame 99, whereby an opening is provided in the front of the frame 99 to permit a driven shaft of a speed reducer 132 to pass therethrough. The upper part of the frame 99 may be reinforced, if desired, by four angle bars 125 which encompass the upper ends of the plates 121, 122, 123 and 124 and are welded thereto, and to each other at the ends.

A rectangular opening 126 may be formed in the side plate 121 of the elevator frame 99 to permit ready access to the interior of the elevator frame 99 so that any of the several parts of the elevating mechanism 120 may be serviced or adjusted for proper operation. The opening 126 may normally be closed by means of a door 127 which is connected on one side to the side plate 121 by means of a pair of hinges 128. A pair of latches 129, 129 on the door 127 are adapted to engage keepers 130, 130 on the side plate 121 to hold the door 127 in a closed position. To permit the door 127 to be opened, the latches 129, 129 are simply lifted out of mating engagement with the keepers 130, 130, whereupon the door may then be opened, provided that the table structure 94 has been first elevated to its uppermost position, namely, the position illustrated in Fig. 4.

The elevating mechanism 120 for rotating the lifting screws 106, 107 and 108 includes an electric motor 131 which is rigidly bolted to the base part 96, Fig. 7. The shaft of this motor 131 is coupled to a gear type speed reducer 132, which is also rigidly bolted to the base part 96. The output shaft of the speed reducer 132 has a bevel gear 133 fixed thereon, which gear meshes with an intermediate bevel gear 134 keyed on a vertical lathe shaft 135. The lathe shaft 135 is supported at its lower end by a thrust bearing 136 mounted on the base part 96; a pillow block bearing 137, which is bolted to the side plate 122 of the elevator frame 99, supports the lathe shaft 135 near its upper end. On the upper end of the lathe shaft 135 is an intermediate spur gear 138 which meshes with a final gear 139 keyed on the lifting screw 106. The lifting screws 107 and 108 have a driven connection with the lifting screw 106 by means of an endless chain 141, Fig. 5, which is trained around sprockets 142, 143 and 144 fixedly mounted on the lifting screws 106, 107 and 108, respectively.

When the strip winder 2 is in operation, the electric motor 131 is energized, whereby rotational power is transmitted through the speed reducer 132 to the bevel gear 133, and thence through the bevel gear 134, the lathe shaft 135, and the spur gear 138, to the final gear 139 whereby the lifting screw 106 is rotated. Since the lifting screws 107 and 108 are driven from the lifting screw 106, all three lifting screws 106, 107 and 108 will rotate in unison, whereby the table structure 94 is caused to elevate uniformly.

In order to take up any slack which may be present in the chain 141, a chain take-up 145 (Figs. 5 and 6) may be provided. This chain take-up 145 may be mounted on the top of the pedestal 114. The chain take-up 145 may include a base block 146 mounted rigidly on the top of the pedestal 114, this block 146 having a slideway 147 formed therein to receive a slide block 148. The slide block 148 carries a vertical stub shaft 149 upon which a tightener sprocket 150 is rotatably mounted. The slide block 148 may be moved in the slideway 147 by means of an adjusting screw 151, this adjusting screw 151 having threaded engagement in a boss 152 rigid with one end of the base block 146. Located on one side of the chain take-up 145 is a rotatable idler sprocket 153 carried by the pedestal 140; the sprocket 144 on the lifting screw 108 is disposed on the opposite side of the chain take-up 145. The chain 141 is trained around the sprockets 142, 143, 144 and 153 and around the tightener sprocket 150, as clearly shown in Fig. 5. To take up any slack in the chain 141, the adjusting screw 151 may be turned manually in a direction such as to cause the tightener sprocket 150 to move rearwardly until the proper tension has been set in the chain 141.

The three principal reaches of the chain 141 pass through hollow chain guard tubes 154, 155 and 156 which are provided for shielding or guarding the aforesaid reaches of the chain from damage (see Figs. 5 and 6). The chain guard tubes 154, 155 and 156 may be supported above the base 93 and held in proper alignment with the respective reaches of the chain which pass therethrough, by means of vertical rods 157 which are rigidly bolted, at their lower ends, to the base 93, and at their upper ends, to the respective tubes 154—156. Vertical slots 158 and 159, Fig. 5, may be formed in the skirt parts 104 and 105 of the skirt 103 to provide proper clearance between the skirt 103 and the chain guard tubes 154 and 155 whenever the table structure 94 is raised or lowered.

The liner 5 is carried on the strip winder 2 by means of the truck 102, Figs. 11 and 12. The truck 102 is rollably mounted on the table top 101 so that the liner carried thereby may be rotated during operation of the strip winder, in order to facilitate winding of the conduit strip 4 upon the walls of the liner body. The truck 102 may comprise an essentially rectangular shaped frame 160 embodying four corner members 161, 162, 163 and 164 bored horizontally to receive the end portions of two spaced, elongated side rods 165 and 166, which form the sides of the truck frame 160. Other bores in the respective corner members 161, 162, 163 and 164 also receive the end portions of two spaced end rods 167 and 168, which form the ends of the truck frame 160. In order to brace the truck frame 160, crossed tie rods 169 and 170 may be provided. The tie rod 169 is connected at its opposite ends to the diagonally opposite corner members 162 and 164, while tie rod 170 is connected at its opposite ends to the diagonally opposite corner members 161 and 163. The tie rods 169 and 170 may be broken near their central portions to connect with turnbuckles 171 and 172, respectively, which are adjustable for tightening the truck frame 160. The truck frame 160 is supported above the table top 101 by means of four feet 173 (Fig. 34) threadedly connected to the respective corner members 161, 162, 163 and 164 and extending downwardly therefrom. A socket or recess is provided in the lower end of each foot 173 to receive a ball roller 174 which has rolling contact on the table top 101; the truck 102, therefore, will roll on the table top 101 whenever the said truck is pushed or pulled.

The truck frame 160 includes a plurality of rest blocks 175, Fig. 11, upon which the liner 5 is adapted to rest when it is mounted on the truck 102. Four of the rest blocks 175, separately identified in the drawings by the numerals 176, 177, 178 and 179, are L-shaped and are rigidly mounted on top of the corner member 161, 162, 163 and 164, respectively. Two additional rest blocks 175, separately identified by the numerals 180 and 181, are mounted in spaced relationship on the side rod 166; two other of the rest blocks 175, separately identified by the numerals 182 and 183, are fixedly secured to the top surfaces of supporting blocks 184 and 185, respectively, the supporting blocks 184 and 185 being mounted in spaced relationship on the side rod 165 of the truck frame. Each of the rest blocks 175 has a flat, horizontal upper surface 186. When the liner 5 is mounted in position on the truck 102 the bottom wall 91 of the liner 5 rests firmly upon the flat upper surfaces 186 of the rest blocks 175.

The supporting blocks 184 and 185 are provided with integral horizontal flanges 187 and 188, respectively, which are disposed directly opposite two horizontal flanges 189 and 190 formed integral with the rest blocks 180 and 181, respectively. The flange 187 on the supporting block 184 is bolted to one end of a spacer bar 191 which extends across the truck frame 160, and the flange 190 on the rest block 181 is bolted to the opposite end of the spacer bar 191. Similarly, the flange 188 on the supporting block 185 is tightly bolted to one end of a second spacer bar 192, and the flange 189 on the rest block 180 is bolted to the other end of the spacer bar 192. The spacer bars 191 and 192, along with the crossed tie rods 169 and 170, brace the truck frame 160 rigidly and prevent the latter from twisting or distorting.

The truck 102 is provided with means for holding the liner 5 in proper position on the truck, so that the liner 5 may be prevented from shifting about on the truck 102 while the strip winder 2 is performing the strip winding operation. Such holding means comprises a plurality of fixed locating jaws 193, which are disposed on one side of the truck frame 160, and a series of clamping members 194, which are positioned on the opposite side of the truck frame 160 (Figs. 11, 12 and 34).

The series of fixed locating jaws 193 includes two curved blocks 195 and 196 which are firmly attached to the outer corners of the corner members 161 and 162, respectively. The series of fixed locating jaws 193 also includes two upright bosses 197 and 198, which extend upwardly from the outer ends of the rest blocks 180 and 181, respectively. The inner surfaces 199 of the locating jaws 193 are adapted to abut against one side of the liner 5 when the liner is properly positioned on the several rest blocks 175, as clearly shown in Fig. 34. Each of the fixed locating jaws 193 has an angular slot 200 formed in its lower end to receive the angular flange 92 on the liner 5. The clamping members 194, being disposed on the opposite side of the liner body 84 when the latter is mounted on the truck 102, are adapted to press against the said opposite side of the liner to hold the first said side in abutting engagement with the inner surfaces 199 of the locating jaws 193.

The clamping members 194 cooperate with the locating jaws 193 to hold the liner 5 on the truck 102. The locating jaws 193 engage one side of the liner body; the clamping members 194 may be brought into clamping engagement with the other side of the liner body so that the liner may be held rigidly on the truck 102. Two of the clamping members 194, individually designated by the numerals 201 and 202, are disposed atop the corner members 163 and 164, respectively. The other two clamping members separately designated by the numerals 203 and 204, are mounted atop the supporting blocks 184 and 185. The constructions of the individual clamping members 201—204 are identical. The following description of the construction and operation of one of the clamping members, namely, member 202, will therefore suffice in describing the construction and operation of the clamping members 201, 203, and 204.

Having particular reference to Fig. 34, the clamping member 202 embodies an L-shaped jaw member 205 which is supported on a flat top surface 206 of the corner member 164. The jaw member 205 comprises a horizontal leg 207 slidably mounted on the surface 206, and an upwardly projecting vertical leg 208 integral with the outer end of the horizontal leg 207. At the upper end of the vertical jaw leg 208 there is formed an inwardly projecting lug 209 which has a strip of material 210 (such as rubber or the like) fastened to its inner face. The jaw member 205 is guided for lateral movement with respect to the truck frame by means of the rest block 179, which bridges over the horizontal leg 207 and is fastened rigidly to the corner member 164.

After the liner body has been mounted in proper position on the rest blocks 175, the jaw member 205 is moved inwardly to clamp the liner body 84 between the inner surfaces 199 on the locating jaws 193 and the strip of material 210 on the jaw member 205. The jaw member 205 may be moved into clamping engagement with the liner body 84 by manually actuating an elongated rod 211 which extends from one end of the truck 102 to the other end, as shown in Fig. 11. The portions of the rod 211 which are adjacent the clamping members 194 are square in transverse cross section, and are indicated in Figs. 11, 12, 34, and 36 by the numeral 212. One end of the rod 211 has a hub 213 mounted thereon, which hub forms an integral part of a handle 214. A pin 215 which is mounted in the hub 213 projects into, and has a loose sliding fit in an annular groove 216 formed in one end of the rod 211 (see Fig. 36). This arrangement enables the rod 211 to be moved axially by first lifting the handle 214 out of engagement with a handle keeper 217 and then pulling the handle outwardly, or in a direction away from the truck frame 160.

Each of the square portions 212 of the rod 211 is provided with a slot 218 in which a cam block 219 is tightly fitted. The inner surface 220 of this cam block 219 is inclined (see Fig. 36), and is adapted to have sliding contact with a pin 221 which projects upwardly from the inner end of the horizontal leg 207 of each jaw member 205 (see Fig. 34). When the rod 211 is moved axially to the position shown in Fig. 36, the inclined surface 220 of the cam block 219 cams the pin 221 inwardly, thereby causing the jaw member 205 to move inwardly into clamping engagement with the liner body. Such clamping action prevents any horizontal shifting movement of the liner 5 on the truck 102. The flange 92 on the liner body 84 projects into the angular slots 200 of the locating jaws 193, and under the strips 210 on the jaw member 205 when the jaw members are brought into engagement with the liner, whereby the liner is caused to be firmly seated and held in a proper position on the truck.

The jaw member 205 is normally urged to an outward position by a compression spring 222 which is interposed between the jaw member 205 and the rest block 179. When the jaw member 205 is in such position, the flange 92 on the liner body 84 is able to clear the jaw member 205 and the locating jaws 193 when the liner 5 is placed on the flat, upper surfaces 186 of the rest blocks 175.

An important feature of the invention is the provision of novel means for moving and manipulating the truck 48 along the table top 46 in a manner such that the conduit strip 4 may be coiled around the liner body while the said conduit strip 4 is being continuously welded to the liner body by the welding apparatus 6. This means includes, firstly, a rotatable drive roller 223 which is adapted to move the truck along the table top 101 in a manner such that the conduit strip 4 may be applied successively to the vertical walls of the liner body 84, and secondly, a pair of pivotally mounted truck swinging arms 256 and 257 which operate periodically and alternately to swing the truck 102 in a 90° arc so that the conduit strip 4 may be brought around each of the successive rounded corners 89 of the liner body 84.

The drive roller 223 is adapted to be connected operably to the truck 102 by having frictional rolling engagement with the outer surface of an endless track 224 mounted on, and encircling, the periphery of the truck frame 160. The track 224 is maintained in contact with the drive roller 223 by means of a pressure roller 225.

In order that the pressure roller 225 may maintain the track 224 in driving contact with the drive roller 223, the pressure roller 225 is rotatably mounted on a stub shaft 226, Fig. 34, which is eccentrically positioned on the upper end of a vertical shaft 227 and which forms an integral part thereof. The shaft 227 is supported at its lower end by a bracket secured to a frame 228, which is suspended rigidly from the table top 101. A crank arm 229 is secured to the shaft 227, and is pivotally connected at its outer end to one end of a link 230, the other end of the link 230 being pivotally connected to one end of a rod 231 which passes loosely through a bracket 232 rigid with the frame 228. A compression spring 233 is compressed between the bracket 232 and a nut 234 threaded on the other end of the rod 231. This spring 233 produces a tension in the rod 231 and the link 230, such tension, in turn, causing the crank arm 229 to exert a torque on the shaft 227 and on the eccentric stub shaft 226, whereby the pressure roller 225 is urged against the inner surface of the track 224 on the truck 102 so as to hold the track 224 in contact with the peripheral surface of the drive roller, as shown in Fig. 35.

The peripheral surface of the drive roller 223 preferably is knurled so that there will be no slippage between the drive roller 223 and the track 224 as the truck 102 is being motivated along the table top 101 by the drive roller 223.

The drive mechanism for rotating the drive roller 223 is shown most clearly in Figs. 25, 26, 27, and 34. This drive mechanism includes an electric motor 235 which is rigidly mounted in a horizontal position on the frame 228. The shaft of the motor 235 is coupled to a gear type speed reducer 236 which is mounted on the frame 228 and is in alignment with the motor 235. The output shaft of the speed reducer 236 has a bevel gear 237 fixedly mounted thereon, Fig. 26. This bevel gear 237 meshes with another bevel gear 238, which latter gear is mounted concentrically on the hub of a third bevel gear 239. The gear 238 is prevented from rotative movement with respect to the gear 239 by means of a plurality of pins or the like which pass through each of said gears. The gears 238 and 239 are mounted on the lower end of a vertical rotatable drive shaft 240. This drive shaft 240 is journaled near its lower end in a pillow block bearing 241 which is rigidly bolted to a bracket forming a rigid part of the frame 228. The drive shaft 240 is journaled near its upper end in a bearing 242 which is rigidly secured to the table top 101. Above the bearing 242, the drive shaft 240 passes through an opening in the table top 101 and is reduced in diameter, as indicated at 243, Fig. 34, to provide a reduced part 244. The drive roller 223 is mounted on the reduced part 244 of the drive shaft 240 and is prevented from rotating with respect thereto by means of a key 245, which is tightly fitted in a keyway 246 in the reduced part 244 of shaft 240 and which has a sliding fit in a keyway 247 formed in the drive roller 223.

When the electric motor 235 is energized, power is transmitted through the speed reducer 236, the bevel gears 237 and 238, and the drive shaft 240 to the drive roller 223. The direction of rotation of the motor shaft is such that the drive roller 223 will rotate in a clockwise direction, as viewed in Fig. 2, so that the said drive roller, having frictional contact with the track 224 on the truck 102, will move the truck 102 toward the left along the table top 101. The truck 102 may be guided in such movement by means of two pairs of angles or guide bars 248 and 249 which are fastened to the table top 101 and which extend outwardly in opposite directions from opposite sides of the driver roller 223. The outer surface of the track 224 on the truck 102 is adapted to slide against these guide bars 248 and 249, the truck 102 being restrained from swinging or pivoting on the drive roller 223 or the pressure roller 225 by such guides, except when any of the four corner portions of the track strip 224 is passing between the drive roller 223 and the pressure roller 225.

To permit ready removal of the drive roller 223 from the reduced part 244 of the drive shaft 240, a retainer member 250 is fastened, by bolts or the like, to the top of the drive roller 223. This retainer member 250 is undercut to provide an annular recess 251 for receiving an annular flange 252 which is integral with the lower end of a nut 253, this nut 253 being screw threaded on the upper end of the reduced part 244 of the drive shaft 240. A hand knob 254 is formed integral with the upper end of the nut 253. To remove the drive roller 223 from the reduced part 244, the hand knob 254 is rotated manually in a direction such that the nut 253 will move upwardly, whereby the annular flange 252 on the lower end of the nut 253 will pull the retainer member 250 and the drive roller 223 upwardly with it. When the threads in the reduced part 244 of the drive shaft 240 become disengaged from the cooperating threads in the nut 253, the drive roller 223 may be completely removed from the drive shaft 240.

To ensure that water or other liquids will not leak downwardly along the drive shaft 240, an inner sleeve 255 is positioned around the shaft 240 immediately above the table top 102 and is welded at its lower end to the table top 102. An outer sleeve 255 which is welded at its upper end to the bottom surface of the drive roller 223 is slidably arranged on the inner sleeve 255. This arrangement permits the drive roller 223 to be removed from the drive shaft 246, but prevents moisture from leaking downwardly along the said shaft and into the interior of the strip winder.

In order that the conduit strip 4 may be brought around each of the rounded corners 89 of the liner body 84 while the truck 102 is being moved along the table top 101 by the drive roller 223, the truck swinging arms 256 and 257 are provided (see Figs. 1 and 2). These arms 256 and 257 are operated alternately and independently, and serve to turn the truck 102 through an angle of 90° on the table top 101 whenever a corner of the truck 102 comes adjacent to the drive roller 223 and the pressure roller 225.

The truck swinging arms 256 and 257 are adapted to swing in a horizontal plane along the table top 101. Accordingly, the arms 256 and 257 are mounted at their adjacent ends in arm holders 258 and 259, respectively. The arms 256 and 259 are supported near their outer ends by rollers 260 and 261, respectively, these rollers being adapted to roll on the table top 101. The arm holder 258 for the arm 256 is secured to the upper end of a rotatable inner sleeve shaft 262 mounted concentrically on the vertical shaft 228. The arm holder 259 for the arm 257 is secured to the upper end of a rotatable outer sleeve shaft 263 mounted on the inner sleeve shaft 262. Since the inner sleeve shaft 262 and the outer sleeve shaft 263 are both concentric with the vertical shaft 227, this latter shaft functions as a pivot for the truck swinging arms 256 and 257 in any horizontal swinging movements which either of these arms may execute.

When the truck swinging arms 256 and 257 are not in operation, they extend in opposite directions from the vertical shaft 228; specifically, the arm 256 extends to the right of the shaft 228, and the arm 257 extends to the left of the said shaft. For this reason, the arm 256 will hereinafter be referred to as the "right-hand arm 256," and the arm 257 will be referred to as the "left-hand arm 257."

Both the right-hand arm 256 and the left-hand arm 257 are adapted to be driven from a main clutch shaft 264 (Fig. 25) which is supported on the frame 229 by means of pillow block bearings 265, 266, and 267. A bevel gear 268 secured on one end of the main clutch shaft 264 meshes with the bevel gear 239 on the drive shaft 246, whereby power may be transmitted from the motor 235 to the main clutch shaft 264 through the medium of the speed reducer 236 and the bevel gears 237, 238, 239, and 268.

Mounted on the main clutch shaft 264 are a right-hand arm actuating clutch 269 and a left-hand arm actuating clutch 270. The right-hand arm actuating clutch 269, when operably engaged, transmits rotational power from the main clutch shaft 264 to the inner sleeve shaft 262 whereby the right-hand arm 256 will pivot or swing in a certain direction. Similarly, when the left-hand arm actuating clutch 270 is operably engaged, power may be transmitted from the main clutch shaft 264 to the outer sleeve shaft 263 whereby the left-hand arm 257 will pivot or swing in a certain direction.

The right-hand arm actuating clutch 269 comprises a driving member 271 which is adapted to be shifted either into or out of driving engagement with a driven member 272. The driving member 271 is secured to the clutch shaft 264 by means of a feather key or the like, so that the driving member 271 may be shifted axially on the clutch shaft 264 but cannot rotate with respect thereto. The driving member 271 may be shifted into or out of engagement with the driven member 272 by a clutch arm 273 (Figs. 26 and 27). This clutch arm 273 is pivotally mounted on a pivot pin 274 carried by a bracket rigid with the frame 228. The clutch arm 273 is bifurcated and carries, at one end thereof, a pair of rollers 275, 275 which ride in an annular groove 276 formed in the driving clutch member 271. The other end of the clutch arm 273 is pivotally connected to one end of a plunger 277 passing through a solenoid 278, Fig. 27. A tension spring 279, connected between the other end of the plunger 277 and a bracket 280 rigid with the frame 228, normally maintains the driving clutch member 271 out of engagement with the driven clutch member 272. When the solenoid 278 is energized, however, the plunger 277 moves downwardly (as viewed in Fig. 27), thereby pivoting the clutch arm 273 in a clockwise direction about its pivot pin 274 to move the driving clutch member 271 into driving engagement with the driven clutch member 272. De-energizing the solenoid 278 will cause disengagement of the operable parts of the clutch 269, whereupon any power to the right-hand arm 326 is removed.

The driven member 272 of the right-hand arm actuating clutch 269 is operably connected to the right-hand arm 256 by a plurality of gears and shafts interposed therebetween. Such gearing and shafting may include a bevel gear 281 which is mounted on a sleeve extension 282 forming a part of the driven clutch member 272. The bevel gear 281 meshes with a bevel gear 283 keyed on the lower end of a rotatable vertical sleeve shaft 284. This sleeve shaft 284 may be supported mediate its ends by a pillow block bearing 285 rigid with the frame 228. The upper end of the sleeve shaft 284 has a spur gear 286 keyed thereon, and the spur gear 286 meshes with another spur gear 287 keyed on the lower end of the inner sleeve shaft 262. Since the arm holder 258 for the right-hand arm 256 is secured to the upper end of the inner sleeve shaft 262, an operable connection is thus afforded between the driven clutch member 272 and the right-hand arm 256.

The right-hand arm 256 is operated whenever two conditions are met: (1) either of the lengthwise sides of the truck 102 is arranged adjacent and above this arm, and (2) one of the rounded corner portions of the track 224 on the truck 102 is being fed between the drive roller 223 and the pressure roller 225. Under such conditions the solenoid 278 is energized to engage the right-hand arm actuating clutch 269. Rotational power from the shaft of motor 237 will thereupon be transmitted through the clutch 269 to the inner sleeve shaft 262. Rotation of the inner sleeve shaft 262 causes the right-hand arm 256 to swing about its pivot, namely, the shaft 227. The right-hand arm 256 will swing or pivot a counter-clockwise direction when the motor 235 is in operation and the right-hand arm actuating clutch 269 is engaged. As the right-hand arm 256 swings in a counter-clockwise direction, this arm 256, through the medium of a bracket 288 and a roller 289 carried thereby, Fig. 13, will push against the outer surface of the track strip 224 on the truck 102, whereby the truck 102 will pivot on the pressure roller 225 and swing in a counter-clockwise direction with the right-hand arm 256. After the right-hand arm 256 has turned the truck 102 through a 90° arc, the solenoid 278 is de-energized to disengage the right-hand arm actuating clutch 269, whereupon certain arm return means associated with the right-hand arm 256 causes the arm 256 to withdraw from contact with the truck 102 and return to its original position, namely, the position shown in full lines in Fig. 2.

The means for returning the right-hand arm 256 to its original position includes an arm return lever 290 (Figs. 25, 26, and 27) secured to the spur gear 287 on the inner sleeve shaft 262. The outer end of the arm return lever 290 is pivotally connected to one end of a link 291, the other end of the link 291 being pivotally connected to one end of a rod 292 which passes loosely through a bracket 293 with the frame 228. A spring 294 is compressed between the bracket 293 and a nut 295 threaded on the other end of the rod 292. This spring 294 produces a tension in the rod 292 and the link 291, such tension, in turn, causing the arm return lever 290 to exert a clockwise torque on the inner sleeve shaft 262. When the right-hand arm actuating clutch 256 is disengaged after the right-hand arm 256 has turned the truck 102 counter-clockwise through a 90° arc, the arm returning means described above will swing the right-hand arm 256 in a clockwise direction, until the arm 256 is brought to rest by a stop member 296 projecting upwardly from the table top 101, Figs. 2 and 13. The right-hand arm 256 will remain in this position until the solenoid 278 is again energized.

The left-hand arm 257 operates to turn the truck 102 and the liner 5 thereon through an angle of 90° whenever the truck 102, and the liner 5 thereon, are arranged in the position shown by solid lines in Fig. 2. Before the left-hand arm 257 may connect with a side of the truck 102 it is necessary for the left-hand arm 257 to swing through a clockwise arc of 90°. To this end, a biasing mechanism is provided which is adapted to swing or pivot the left hand arm 257 in a clockwise direction.

The biasing mechanism associated with the left-hand arm 257 is similar to the arm return mechanism utilized in connection with the right-hand arm 256. This biasing mechanism includes an arm or lever 297 secured to the underside of a gear 322 mounted on the lower end of the outer sleeve shaft 263. A link 298 is pivotally connected at one end to the outer end of the arm or lever 297, the other end of the link 298 being pivotally connected to one end of a rod 299 which passes loosely through the bracket 293, Fig. 26. A spring 300 is compressed between the bracket 293 and a nut 301 threaded on the other end of the rod 299. This spring 300 produces a tension in the rod 299 and the link 298, which tension acts upon the arm or lever 297 to produce a clockwise torque on the outer sleeve shaft 263. This clockwise torque urges the left-hand arm 257 in a clockwise direction, whereby the arm 257, when released from the position shown in full lines in Fig. 2, will pivot in a clockwise direction on the table top 101 to meet the truck 102. The left-hand arm 257, however, is held in the position shown in Figs. 2 and 14 except such times when the truck 102 is positioned as shown by solid lines in Fig. 2 at which times the left-hand arm 257 is released so that it will swing in a clockwise direction under the influence of the spring 414 until it connects with the truck 102.

The means for holding the left-hand arm 257 in the position shown in Figs. 2 and 14 comprises a plunger 301 which is pivotally mounted on a bracket 302 secured on the left-hand arm 257. The plunger 301 is adapted to be received in the bore of an arm holding solenoid 303 mounted fixedly on the table top 101. The arm holding solenoid 303 is ordinarily energized so that the plunger 301 will be held in the bore of the solenoid 303, whereby the left-hand arm 257 is held in the position shown in Fig. 2 or Fig. 14. A stop member 304 secured to the table top 101 prevents this left-hand arm 257 from pivoting any further than the position of Figs. 2 and 14. When, however, either of the rounded corner portions of the track strip 260 on truck 102 is about to pass between the drive roller 223 and the pressure roller 225, the arm holding solenoid 303 is de-energized, to release the plunger 301, whereby the left-hand arm 257 will swing or pivot in a clockwise direction until it operably engages the truck 102.

When the left-hand arm 257 meets the truck 102, this arm 257 connects with the truck 102 by means of a latch device 305, Figs. 14, 15 and 33. The latch device 305 includes an L-shaped bracket 306 (Fig. 33) which is secured to the left-hand arm 257 and which extends outwardly and upwardly therefrom. To the upper end of the bracket 306 is hingedly connected a latch plate 307 which has a curved down-turned flange 308 at one end. This curved flange 308 is adapted to latch over the upper edge of an angular, in-turned flange 309 integral with the upper edge of the track strip 224 on the truck 102, whereby the latching device 305 may be operably connected to the truck 102. After the latching device 305 has engaged the flange 309 on the truck 102, the left-hand arm 257 is pivoted or swung in a counter-clockwise direction, whereupon the truck 102 (and the liner 5 on the truck) will be pulled and pivoted counter-clockwise by the left-hand arm 257, through the medium of the latch device 305.

It should be noted that the flange 309 extends along the sides of the truck 102, but does not extend across the ends of the truck 102.

Drive mechanism is provided for the purpose of pivoting the left-hand arm 257 in a counter-clockwise direction after the latter has been connected to the truck 102 by means of the latching device 305. Such drive mechanism comprises the left-hand arm actuating clutch 270 on the main clutch shaft 264, Figs. 25, 26 and 27, and gearing connecting this clutch 270 with the outer sleeve shaft 263, on which is mounted the arm holder 259 for carrying the left-hand arm 257.

The left-hand arm actuating clutch 270 is identical to the right-hand arm actuating clutch 269. The clutch 270 comprises a driving member 310 feather-keyed on the main clutch shaft 264 and shiftable axially either into or out of driving engagement with a driven member 311 rotatably mounted on the main clutch shaft 264.

The driving member 310 may be shifted into engagement with the driven member 311 by an arrangement similar to that employed in connection with the right-hand arm actuating clutch 269. Such an arrangement includes a clutch arm 312, Fig. 27, which is actuated by energizing or de-energizing a solenoid 313. As long as the solenoid 313 is de-energized, the clutch arm 312, being under the influence of a spring 314 will separate the driving clutch member 310 from the driven clutch member 311. When the solenoid 313 is energized, the driving clutch member 310 is brought into driving engagement with the driven clutch member 311, and thereafter is maintained in such engagement until such time when the solenoid 313 is de-energized.

The driven clutch member 311 of the left-hand arm actuating clutch 270 is provided with a sleeve extension 315 upon which a bevel gear 316 is secured. This bevel gear 316 drives another bevel gear 317 secured on the lower end of a vertical shaft 318 which extends upwardly through the vertical sleeve shaft 284. The upper end of the shaft 318 is journaled in a bearing 319 mounted on the under side of the table top 101. A gear 320, which is also secured on the vertical shaft 318, meshes with an idler gear 321; the idler gear 321 drives a gear 322 keyed on the lower end of the outer sleeve shaft 263. Since the arm holder 259 for the left-hand arm 257 is secured to the upper end of the outer sleeve shaft 263, a driving connection is therefore provided between the driven clutch member 311 and the left-hand arm 257.

As has been mentioned hereinbefore, the right-hand arm 256 is driven by the motor 235 whenever the right-hand arm actuating clutch 269 is engaged. Similarly, the left-hand arm 257 is driven by the motor 235 whenever the left-hand arm actuating clutch 270 is engaged. The right-hand arm actuating clutch 269 is operatively controlled by the solenoid 278, whereas the left-hand arm actuating clutch 270 is operatively controlled by the solenoid 313. Electric power is connected to, or disconnected from, the solenoids 278 and 313 by means of two single-pole single-throw switches 323 and 324.

The switches 323 and 324, Figs. 13 and 29, are preferably of the "micro-switch" type, and are supported by a vertical bracket or support 325 which is positioned in front of the drive roller 223 and projects upwardly from the table top 101. The switches 323, 324 and an additional switch 326 are arranged in a vertical bank on top of the bracket 325. The switch 323 controls electric power applied to the solenoid 278, and the switch 324 controls electric power applied to the solenoid 313. Switch 326 controls electric power applied to the arm holding solenoid 303. Each of the switches 323, 324 and 326 is provided with a roller follower 327 which is rotatably mounted on the movable contact element of the switch. The separate roller followers 327 are engaged, at predetermined time intervals during operation of the strip winder 2, by certain operating means on the truck 102, whereby the swinging or pivotal movements which the right-hand arm 256 and the left-hand arm 257 are to perform will occur at the proper times.

The means for actuating the respective switches 324, 325 and 326 consist of four curved switch-actuating cams 328 which are disposed outwardly of the four corners of the truck 102, Fig. 11. These switch-actuating cams 328 are individually designated by the numerals 329, 330, 331 and 332. The switch-actuating cams 329, 330, 331 and 332 are rigidly fastened to the outer ends of horizontal bracket members 333, 334, 335 and 336, respectively, which project outwardly from the corner members 161, 162, 163 and 164 of the truck frame 160. The switch actuating cams 330 and 332 (Fig. 29) are identical, and are mounted at a height such that these cams 330 and 332 may engage and actuate the roller followers 327 of the switches 324 and 326. Furthermore, the cams 330 and 332 have integral, narrowed extensions 337 and 338, respectively, which are provided for actuating the switch 326 (which controls the arm holding solenoid 303), at a time prior to the time when switch 325 (which controls the solenoid 278) is actuated by the wider parts of the cams 330 and 332. Also, the switch actuating cams 329 and 331 are identical, and are arranged at a height such that these cams 329 and 331 may engage and actuate the roller follower 327 of the switch 323 (Fig. 29), which controls the solenoid 313.

The switches 323, 324 and 326 are actuated periodically by the cams 328 while the truck 102 is being rolled along the table top 101 by means of the drive roller 223. The particular sequence in which the switches 323, 324 and 326 are actuated may best be understood by having reference to Fig. 29. The sequential operation of the solenoids 278, 313 and 303 which are controlled by the switches 323, 324 and 326 respectively, is graphically illustrated in Fig. 28. The diagrammatic views of Figs. 17–24, inclusive, show the resultant operation of the truck swinging arms 256 and 257, and the manner in which the conduit strip 4 is wound around the liner 5.

In Figs. 17–24, inclusive, the liner 5 is shown in plan outline and the four rounded corners 89 of the liner 5 are individually designated by the letters A, B, C and D. The liner corners A, B, C and D are henceforth assumed to be disposed above the corners A', B', C' and D', respectively, of the truck 102, Fig. 11. Since the corners A', B', C' and D' of the truck 102 correspond with the switch actuating cams 329, 332, 331 and 330, respectively (Fig. 11) the corners A, B, C and D of the liner 5 also may be considered to correspond with the switch-actuating cams 329, 332, 331 and 330, respectively.

For the purpose of describing the operating relationships between the truck swinging arms 256 and 257 the switches 323, 324 and 326, and the cams 329—332, it will be assumed that the truck 102 is initially positioned such that the liner 5 is in the position shown in Fig. 17. In this position, the conduit strip 4, which is fed against the liner 5 from the rolling mill 1, is tack-welded to the liner 5 at the point indicated by the letter X. The motor 235 is then energized, thereupon causing the drive roller 223 to rotate in a clockwise direction, as indicated in Figs. 17–24, inclusive, by the directional arrow appearing on the drive roller 223.

The motors 131 and 235 are then simultaneously energized, whereby the lifting screws 106, 107 and 108 rotate to raise the table structure, and the drive roller 223 rotates to move the truck 102 from the position of Fig. 17 to the position of Fig. 18. As corner B' of truck 102 approaches the drive roller 223, the extension 337 on the switch actuating cam 332 engages the roller follower 327 on switch 326 so as to de-energize the arm holding solenoid 303. The spring 300 then contracts, whereby the left-hand arm 257 swings in a clockwise direction from the position of Fig. 18 until the latch device 305 engages the flange 309 on the truck 102. The widened part of the switch actuating cam 332 then contacts the roller follower 327 on switch 324 to close the contacts of said switch, whereupon the solenoid 313 is energized. When the solenoid 313 is energized, the left-hand arm actuating clutch 270 is engaged to cause the left-hand arm 257 to swing in a counter-clockwise direction, whereby the truck 102 will pivot or turn counter-clockwise with the left-hand arm 257. The simultaneous counter-clockwise movements of the left-hand arm 257 and the truck 102 continue until the switch actuating cam 332 disengages the roller followers 327 on the switches 224 and 226, whereupon the arm holding solenoid 303 is energized and the solenoid 313 is de-energized. The stop member 304 prevents the arm from moving beyond the solid line position of Fig. 19, and the arm holding solenoid 303, which is now energized, holds the left-hand arm 257 in the latter said position. The drive roller 223, which is still rotating in a clockwise direction, then advances the truck 102 and the liner 5 from the position shown in Fig. 19 to the position shown in Fig. 20. Shortly before the truck reaches the position of Fig. 20, the flange 309 slides out from under the latch plate 307 of the latch device 305, as shown in Figs. 31 and 32, whereby the truck 102 is operatively disconnected from the left-hand arm 257. When the truck 102 and the liner 5 reach the position of Fig. 20, the switch actuating cam 331 engages the roller follower 327 on the switch 323, whereupon the contacts of the switch 323 are closed. At this instant the solenoid 278 is energized, thus causing the right-hand arm actuating clutch 269 to engage. When the clutch 269 engages, the right-hand arm 256 pivots or swings in a counterclockwise direction and turns the truck 102 and the liner 5 through a 90° arc to the dotted line position of Fig. 21. At the instant when the right-hand arm 256, the truck 102 and the liner 5 reach the dotted line position of Fig. 21, the switch actuating cam 331 disengages from the roller follower 327 of switch 323, thereby causing the contacts of switch 323 to open. Opening the contacts of switch 323 results in de-energization of the solenoid 278, whereupon the right-hand arm actuating clutch 270 is disengaged. The spring 294 then contracts from its stretched condition to swing the right-hand arm 257 to its original position against the stop member 296. Meanwhile, the truck 102 and the liner 5 are moved to the right by the drive roller 223 until the extension 338 on the switch actuating cam 330 (at corner D' on truck 102) engages the roller follower 327 on switch 326. The left-hand arm 257 is thereupon operated to turn the truck 102 in a counterclockwise direction, this operation of the left-hand arm 257 embodying the same sequence of events as occured when the arm 257 was operated to pivot the truck 102 about corner B'. The truck 102 and the liner 5 are therefore pivoted from the position of Fig. 22 to the dotted line position of Fig. 23. After reaching the latter said position, the truck 102 and the liner 5 are moved by the drive roller 223 to the position of Fig. 24, whereupon the switch actuating cam 329 engages the roller follower 327 on switch 323 and the right-hand arm 256 operates in the same manner as it did when it turned the truck 102 about the corner C'. The truck 102 and the liner 5 are therefore pivoted 90° by the right-hand arm 256, whereby the truck 102 and the liner 5 are again in the initial position of Fig. 17. It may thus be seen that the liner 5 has been turned through an arc of 360° by alternate operations of the right-hand arm 256 and the left-hand arm 257 upon the truck 102. The periodic and alternate swinging of the right-hand arm 256 and the left-hand arm 257 will continue so long as the drive roller 223 is rotated, whereby the conduit strip 4 is wound about the liner 5 in the manner illustrated in Figs. 17–24, inclusive. While the truck and container are being moved by the drive roller 223 and rotated by the truck swinging arms 256 and 257, the table structure is raised by means of the lifting screws 106, 107 and 108, whereby the conduit strip 4 will be coiled in a helical path around the outer surfaces of the liner 5. While the conduit strip 4 is being wound about the liner 5, the conduit strip 4 is welded thereto by means of the electric welding apparatus 6.

The welding apparatus 6 (Figs. 1, 3, 4 and 37) is provided for the purpose of welding the attaching legs or flanges 47 to the outer surfaces of the walls of the liner 5. The welding apparatus 6 is preferably located directly above the drive roller 223 and the pressure roller 225, and is mounted in a stationary position with respect to the base of the strip winder 2. The welding apparatus 6 may comprise a yoke-shaped frame 339 which is supported by vertical bracket 340 rigidly fastened to the base. The frame 339 embodies spaced vertical legs 341 and 342, the legs 341 being positioned on the outside of the liner 5 and the leg 342 being positioned on the inside of the liner 5. The conduit strip 4 is fed from the rolling mill 1 to a position between the liner 5 and two spaced rotatable welding rollers 343 and 344 carried by the leg 341, as clearly shown in Fig. 37. Backing rollers 345 and 346, which are carried by the leg 342 of the frame 339, cooperate with the welding rollers 343 and 344 so that the welding rollers 343 and 344 are tightly pressed or forced against the attaching legs or flanges 47 of the conduit strip 4. The welding apparatus 6 is adapted to perform a continuous seam weld 347 between the attaching legs or flanges 47 and the liner 5. While the truck 102 and the liner 5 are being moved and rotated by means of the drive roller 223 and the truck swinging arms 256 and 257, and while the truck 102 and the liner 5 are being raised by operation of the lifting screws 106, 107 and 108, the welding apparatus is energized. As a result, the conduit strip 4 is welded in a helical path around the outer surfaces of the vertical walls of the container or liner 5, whereby a helical passage 348 is provided between the vertical walls of the liner and the rounded part 46 of the conduit strip 4. The winding and welding operations commence at such time when the motors 131 and 235 and the welding apparatus 6 are energized simultaneously by the operator, and when the table top 101 is in the position of Fig. 3. The winding and welding operations cease when the table top 101 arrives at the elevated position of Fig. 4, at which time the motors 131 and 235 and the welding apparatus 6 are de-energized by the operator. The projecting ends of the conduit strip 4 may be cut off after the conduit strip 4 has been wound around and welded to the liner or container. Suitable unions or couplings (not shown) may be attached to the upper and lower ends of the conduit strip to provide means for connecting the passage 348 around completed evaporator to inlet and outlet tubes associated with the refrigeration apparatus to which the evaporator is to be connected.

The operation of the strip winder 2 has been fully described throughout the preceding description of the construction of the strip winder. It is not deemed necessary, therefore, to describe further the operation of the strip winder.

The invention provides a machine which is adapted for making a refrigeration evaporator from a hollow container or liner 5 by application thereto of a hat-shaped conduit strip 4. The conduit strip 4 is wound in a helical path around the liner or container, and is welded thereto by the welding apparatus 6. The machine of the invention operates automatically and is capable of handling both large and small containers or liners. Furthermore the cost of operation is relatively small in comparison with the cost of making refrigeration evaporators by any of the methods which have been employed heretofore. The completed evaporator which is fabricated by the machine is extremely efficient in operation, since the corrugations 50 which are formed in the rounded central part 46 of the conduit strip 4 cause the desired degree of turbulence in the refrigerant fluid which passes through the passage 349 formed by the conduit strip 4 and the walls of the container or liner 5.

Changes may be made in the form, construction and arrangement of the parts without departing from the spirit of the invention or sacrificing any of its advantages and the right is hereby reserved to make all such changes as fall fairly in the scope of the following claims.

The invention is hereby claimed as follows:

1. A machine for making refrigeration evaporators from containers, comprising a table structure, mechanism for elevating the table structure, a truck movable on the table structure and adapted for carrying a container, means for moving the said truck on said table structure, means for periodically swinging said truck through successive arcs on the table structure, means for feeding a channel strip to a station adjacent said container at a strip delivery rate corresponding with the movement of said truck, and seam welding apparatus at said station for welding said strip to the container while the latter is being elevated, moved and swung periodically, whereby a helical conduit is formed around said container.

2. A machine for making refrigeration evaporators from containers, comprising a table structure including a table top, mechanism for elevating the table structure, a truck movable on the table top and having secured on its periphery an endless track, a drive roller having frictional engagement with one side of the track, a pressure roller for maintaining the track in contacting engagement with the drive roller, mechanism for rotating the drive roller so as to move the track between the drive roller and the pressure roller whereby the truck will move on the table top, means for periodically turning the truck through an arc of predetermined magnitude, at predetermined intervals of time, means for feeding a channel strip of material adjacent said container, and seam welding apparatus for welding the strip to the container, while the latter is being elevated, moved and periodically swung by virtue of its resting on the truck, whereby a helical conduit is formed around said container.

3. A machine for making refrigeration evaporators from containers, comprising a base, a table structure movable vertically above the base, lifting screws mounted on said base and operably connected to the table structure, means for rotating said lifting screws in unison whereby said table structure may be raised or lowered, a truck movably mounted on the table structure, and having an endless track mounted on the periphery thereof, a drive roller, means for maintaining the track in frictional contact with said drive roller, drive mechanism for rotating said drive roller whereby the drive roller will move the truck in a predetermined direction along the table top, means operable for pivoting the truck through an arc of predetermined magnitude and direction whenever a corner of the truck comes adjacent the drive roller, means for feeding a channel strip of metal to a station adjacent the container, and seam welding apparatus at said station for welding the strip to the container while the latter is being simultaneously elevated and moved and swung periodically by virtue of its resting on the truck, whereby a helical conduit is formed around said container.

4. A machine for making refrigeration liners comprising a table structure, mechanism for elevating the table structure, a truck movable on the table structure and adapted for carrying a container, means for moving the truck in a predetermined direction on said table structure, means for swinging said truck through an arc about one corner thereof at periodic intervals, switch means for controlling said truck swinging means, means on said truck for actuating said switch means whereby said truck swinging means are operated periodically while the truck is being moved on the table structure by said truck moving means, means for feeding a conduit strip having spaced attaching webs and a central longitudinally bulged part to a station adjacent said container, and welding means at said station for welding the attaching webs of the conduit strip to said container to form a helical passage around said container.

5. A machine for making refrigeration liners comprising a table structure, mechanism for elevating the table structure, a rectangular truck movable on the table structure and adapted for carrying a rectangular container, means for moving the truck in a predetermined direction on said table structure, means for swinging said truck through a 90° arc about one corner thereof at periodic intervals, switch means for controlling said truck swinging means, means on said truck for actuating said switch means whereby said truck swinging means are operated periodically while the truck is being moved on the table structure by said truck moving means, means for feeding a conduit strip having spaced attaching webs and a central longitudinally bulged part to a station adjacent said container, and welding means at said station for welding the attaching webs of the conduit strip to said container to form a helical passage around said container.

6. A machine for making refrigeration evaporators from containers, comprising a strip winding unit and a rolling mill unit, said strip winding unit embodying a table structure, means for elevating said table structure, a truck movably mounted on said table structure and adapted for carrying a container, means for moving the truck on the table structure, and means for periodically turning said truck on said table structure, said rolling mill unit embodying a plurality of pairs of rotatable strip forming rolls for forming a flat strip of material into a conduit strip and for feeding said conduit strip to a station adjacent said container, at a strip delivery rate corresponding with the movement of said truck, means for rotating some of said rolls, and welding means at said station for welding said conduit strip to said container while the truck and container are being simultaneously elevated, moved and swung so as to form a helical passage around said container.

7. A machine for making refrigeration evaporators from containers, comprising a strip winding unit and a rolling mill unit, said strip winding unit embodying a table structure, means for elevating said table structure, a truck movably mounted on said table structure and adapted for carrying a container, means for moving the truck on the table structure, and means for periodically turning said truck on said table structure, said rolling mill unit embodying a plurality of pairs of rotatable strip forming rolls for forming a flat strip of material into a conduit strip and for feeding said conduit strip to a station adjacent said container, at a strip delivery rate corresponding with the movement of said truck, means for rotating some of said rolls, one of said pairs of strip forming rolls including a first roll having a series of undulations formed in the periphery thereof and also including a second roll having another series of undulations formed in the periphery thereof for cooperating with the undulations in the first said roll to form corrugations in the conduit strip, and welding means at said predetermined position for welding said conduit strip to said container while the truck and container are being simultaneously elevated, moved and swung so as to form a helical passage around said container.

DOROTHY W. LARKIN.
*Administratrix of the estate of Lester U. Larkin, deceased.*

REFERENCES CITED

The following references are of record in the file of this patent:

UNITED STATES PATENTS

| Number | Name | Date |
|---|---|---|
| 1,265,709 | Dies | May 7, 1918 |
| 2,174,928 | Riemenschneider | Oct. 3, 1939 |
| 2,280,627 | Chapman | Apr. 21, 1942 |
| 2,282,176 | Fay | May 5, 1942 |
| 2,289,685 | Schoen | July 14, 1942 |
| 2,303,720 | Berkeley | Dec. 1, 1942 |
| 2,313,393 | Mitchell | Mar. 9, 1943 |
| 2,339,219 | Crowley | Jan. 11, 1944 |
| 2,349,865 | Hawk | May 30, 1944 |
| 2,351,152 | Schick | June 13, 1944 |
| 2,440,792 | Wyllie | May 4, 1948 |
| 2,469,815 | Cutright | May 10, 1949 |

FOREIGN PATENTS

| Number | Country | Date |
|---|---|---|
| 567,443 | Germany | Jan. 2, 1933 |
| 118,867 | Australia | Sept. 7, 1944 |
| 606,684 | Great Britain | Aug. 18, 1948 |